(12) United States Patent
Cheung et al.

(10) Patent No.: US 10,380,085 B2
(45) Date of Patent: *Aug. 13, 2019

(54) METHOD, APPARATUS AND COMPUTER PROGRAM FOR MIGRATING RECORDS IN A DATABASE FROM A SOURCE DATABASE SCHEMA TO A TARGET DATABASE SCHEMA

(71) Applicant: International Business Machines Corporation, Armonk, NY (US)

(72) Inventors: Daniel L. Cheung, Basingstoke (GB); Sanjay Nagchowdhury, Southampton (GB); John A. Owen, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/286,551

(22) Filed: Oct. 5, 2016

(65) Prior Publication Data

US 2017/0024383 A1    Jan. 26, 2017

Related U.S. Application Data

(63) Continuation of application No. 12/253,171, filed on Oct. 16, 2008, now Pat. No. 9,471,608.

(30) Foreign Application Priority Data

Oct. 18, 2007  (EP) ..................... 07118790

(51) Int. Cl.
    *G06F 16/21*      (2019.01)
    *G06F 16/28*      (2019.01)

(52) U.S. Cl.
    CPC .......... *G06F 16/214* (2019.01); *G06F 16/212* (2019.01); *G06F 16/288* (2019.01)

(58) Field of Classification Search
    CPC ............. G06F 17/30604; G06F 17/303; G06F 17/30292; G06F 17/30297; G06F 16/214; G06F 16/27
    See application file for complete search history.

(56) References Cited

U.S. PATENT DOCUMENTS

| | | |
|---|---|---|
| 5,386,557 A | 1/1995 | Boykin et al. |
| 5,717,924 A | 2/1998 | Kawai |
| 2002/0174098 A1 | 11/2002 | Wu et al. |
| 2005/0149552 A1 | 7/2005 | Chan et al. |
| 2007/0038651 A1 | 2/2007 | Bernstein et al. |

OTHER PUBLICATIONS

Mikael Ronstrom. "On-Line Schema Update for a Telecom Database." Data Engineering, IEEE, Mar. 2000, pp. 329-338.

*Primary Examiner* — Marc S Somers
(74) *Attorney, Agent, or Firm* — Steven M. Greenberg, Esq.; Shutts & Bowen LLP

(57) ABSTRACT

There is disclosed a system for migrating records in a database from a source database schema to a target database schema. A request is received to delete a state from the source schema. The state is marked as the redundant state. A resultant state is identified to which to migrate database records in the redundant state and a valid migration path is calculated between the redundant state and the resultant state.

11 Claims, 24 Drawing Sheets

Modelling the Migration Path

Interim Schema

Target Schema

Interim Schema Update Script (isu)

- R0 = redundant state
- (if test at 1030 true)
  Allow interim migration action to be performed on redundant state
- (if test at 1050 true)
  add instruction for state to interim schema
- (if test at 1120 true)
  add instruction for action to interim schema

Target Schema Update Script (tsu)

- (if test at 1050 true)
  Remove instruction for state from target schema
- Remove redundant state from target schema
- (if test at 1120 true)
  Remove instruction for action from target schema

Interim Data Migration Script (idm)

- identify all records in redundant state
- (if test at 1050 false)
  Perform 1st action on all redundant records

Target Data Migration Script (tdm)

- update redundant records to perform next action * number of actions in migration path

Figure 8

METHOD, APPARATUS AND COMPUTER PROGRAM FOR MIGRATING RECORDS IN A DATABASE FROM A SOURCE DATABASE SCHEMA TO A TARGET DATABASE SCHEMA

CROSS-REFERENCE TO RELATED APPLICATIONS

This application is a continuation of U.S. patent application Ser. No. 12/253,171, filed Oct. 16, 2008, which claims priority under 35 U.S.C. § 119(a) to European Patent Application Serial Number 07118790.0, filed Oct. 18, 2007, both of which are incorporated herein by reference in their entirety.

FIELD OF THE INVENTION

The invention relates to database schemas and more particularly to the upgrade of a source database schema to a target database schema.

BACKGROUND OF THE INVENTION

Database systems typically use a schema for defining how a database is to be used. Such a schema may specify the types of records that a database system manages and also the rules and relationships associated with these record types. Thus a schema may specify that a user is allowed to perform actions (operations) on a record such as cancel, delete and modify. The schema may also define, for example, exactly which fields in a record may be modified and who is allowed to make such changes.

By way of example only, change control systems exist today for tracking changes made to the source code for software projects. Such change control systems typically use a database schema of the type discussed above. A database schema for a change control system may define record types of: defect; feature; test record; verification record etc. Rules will then define how such records may be inserted, modified, deleted etc.

Software projects are increasingly using iterative development in order to flush out problems and resolve risks and issues as early as possible. The project manager may require updates to the change control system at the beginning of an iteration. This means that the schema used by the change control system may need to be updated many times during the duration of the software project.

A change control schema may have levels of security defined which allow user defined roles to update particular fields for each record type. For example, only an administrator may change the ownership of a defect but any one can add a comment to a defect.

The schema may also be used to integrate the Change Control system with other tools, such as a test case management system and/or a requirements management system.

In order to create a schema, a schema administrator needs to understand:

What the schema will be used for
Who will use the schema and their associated user role
What other tools or services will interact with the schema
The workflow (process) associated with the schema.

Without some kind of intervention, schema migration may cause records within the database to exist in a redundant and thus invalid state. For example schema version 1 may allow records to be in a state of cancelled. The subsequent version of the schema may no longer define the cancelled state. Some records in the database will, however, probably have a cancelled state associated with them and this will cause an exception to be thrown when migration is attempted. Such an exception will typically mean that it is not possible to migrate the database to the new schema.

As schema changes can be quite complex it is often not until the actual upgrade is executed that any data integrity problems are discovered (i.e. during a change slot to upgrade the production system which may be outside working hours).

Additionally, schema changes are not necessarily applied immediately to schema items. Indeed multiple schema changes may be batched together and applied to schema items in one go. This means the schema administrator must know the consequence of all the changes in order to identify the required manual changes to the database containing the schema items. If the schema changes span many months, or even years, this can be difficult.

Furthermore, many software projects involve teams located in multiple geographic locations. Copies of the database exist in each location and changes are replicated between locations to keep them in sync with each other. This also applies to schema changes. The schema changes and associated data migration must be made at all locations before users can update a database in any one location. Whilst the schema updates can be automated, the data migration can not. This can lead to lengthy outages and complex logistics in order to bring all the databases and their associated data up to the required level. This also requires local system administrators to understand the changes required in order to apply them.

Solutions describing workflow and schema evolution are known.

Other documents of interest are:

"Scientific Workflow Management by Database Management" by A Ailamaki, Y Ioannidis, M Livny (Department of Computer Sciences, University of Wisconsin); "Managing Evolving Workflow Specifications with Schema Versioning and Migration Rules" by G Joeris and O Herzog (Intelligent Systems Department, TZI—Center for Computing Technologies University of Bermen); and "Schema Evolution in Process Management Systems" by Stefanie Beate Rinderle from Memmingen (Dissertation in October 2004); and "Dynamic Workflow Schema Evolution Based on Workflow Type Versioning and Workflow Migration" by Markus Kradolfer and Andreas Gepper.

These documents describe the need for workflow engines to cope with change but none describes how to cope with the removal of a state from a schema and what is to happen to affected records.

"Workflow Evolution" by F Casati, S Ceri, B Pernici and G Pozzi (Dipartimento di Elettronica e Informazione—Politecnico di Milano) also deals with the concept of a changing schema and does briefly discuss the removal of a task from a workflow, in the form of a "RemoveSuccessor" primitive. This document does not however discuss the detail of how to cope with database records in a redundant state as a result of the deletion of a state from a database schema.

SUMMARY OF THE INVENTION

According to a first aspect, there is provided a method for migrating records in a database from a source database schema to a target database schema, the method comprising: receiving a request to delete a state from the source schema; marking said state as the redundant state; identifying a resultant state to which to migrate database records in the redundant state; and calculating a valid migration path between the redundant state and the resultant state.

The redundant state is preferably marked as redundant in an interim migration schema.

In one embodiment user input is received indicating the desired resultant state.

In one embodiment, one or more valid and invalid migration paths are identified. A migration path is preferably invalid if it does not permit migration to the resultant state.

In one embodiment, a user is presented with at least one valid migration path between the redundant state and the resultant state. The user is in this embodiment permitted to select a valid migration path to which to migrate database records in the redundant state.

In one embodiment, in order to calculate a valid migration path, it is determined whether an action exists in the source schema to advance a record from the redundant state to a first state in a possible migration path.

If there is no such action (the redundant state is actionless), the user is preferably presented with one or more actions which advance from a state in the source schema to the first state. The user is then preferably permitted to select one of the presented actions to form part of a possible migration path. If an action does exist, the action is preferably presented to the user for selection.

It is preferably determined whether the selected first state is part of a valid migration path. If this is not the case, then the user is requested to select another first state.

In one embodiment, if the redundant state is actionless, then an interim schema is used to permit database records in the redundant state to be moved between the redundant actionless state and the first state.

Database records are preferably migrated to the first state in accordance with the interim schema.

A target schema is preferably created by which to migrate database records in accordance with, the redundant state being absent from the target schema.

A valid migration path is preferably used to migrate database records in the redundant state to the resultant state, in accordance with the target schema.

Database records in the redundant state are preferably identified.

According to a second aspect, there is provided an apparatus for migrating records in a database from a source database schema to a target database schema, the apparatus comprising: means for receiving a request to delete a state from the source schema; means for marking said state as the redundant state; means for identifying a resultant state to which to migrate database records in the redundant state; and means for calculating a valid migration path between the redundant state and the resultant state.

According to a third aspect, there is provided a computer program comprising program code means adapted to perform the following method steps when said program is run on a computer: receiving a request to delete a state from the source schema; marking said state as the redundant state; identifying a resultant state to which to migrate database records in the redundant state; and calculating a valid migration path between the redundant state and the resultant state.

BRIEF DESCRIPTION OF THE DRAWINGS

A preferred embodiment of the present invention will now be described, by way of example only, and with reference to the following drawings:

FIG. 8 shows, in accordance with a preferred embodiment of the present invention, the contents of the scripts used to migrate database records.

DETAILED DESCRIPTION OF THE PREFERRED EMBODIMENT

A mechanism is described for migrating database records from a source schema to a target schema when record states defined as permissible in the source schema have been deleted from the target schema.

Figure 1:
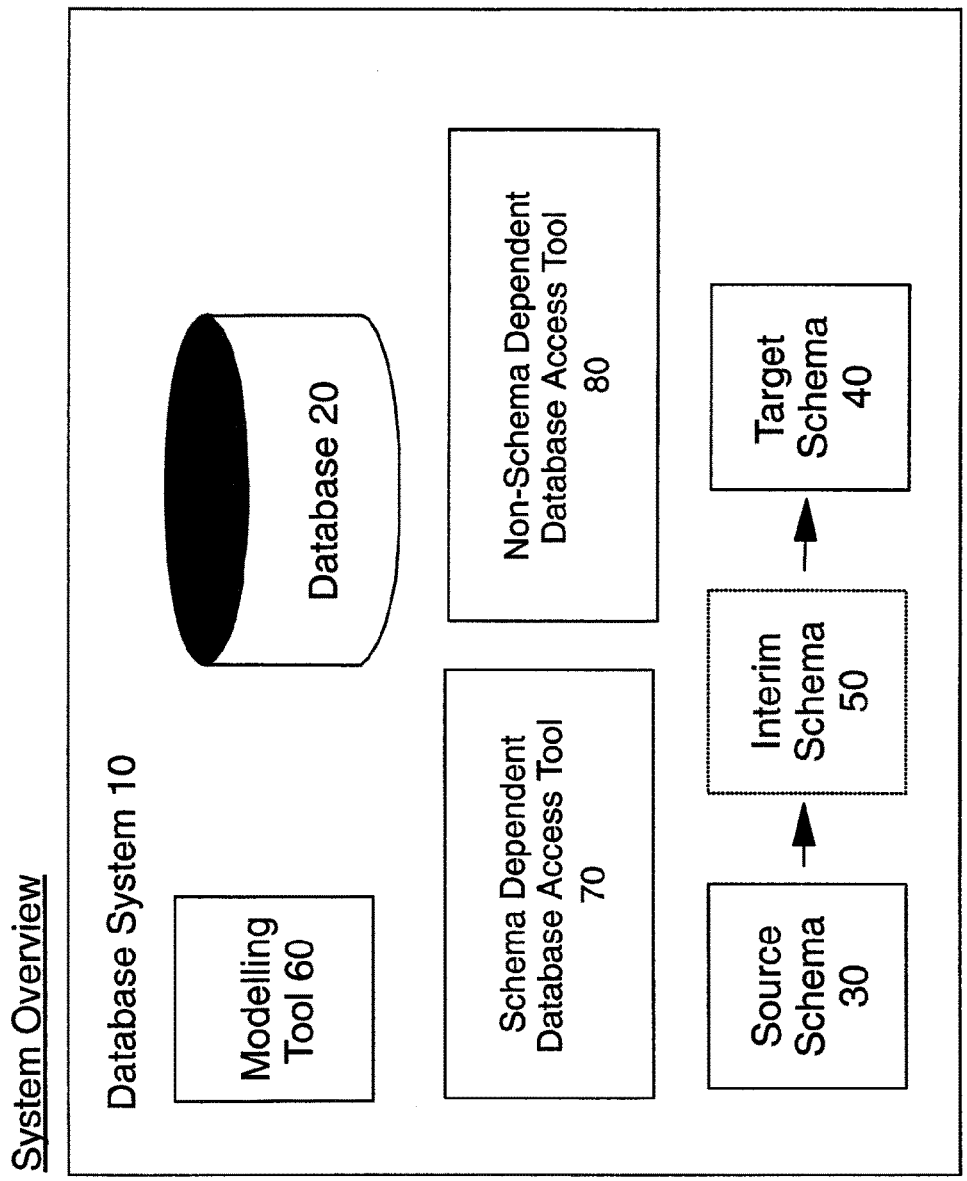
FIG. 1 provides an overview of a database system in accordance with a preferred embodiment of the present invention.

An overview of the system according to a preferred embodiment is shown in FIG. 1. A database system 10 comprises a database 20. The records in database 20 may be in any number of states, as defined by a source schema 30. Changes to data in database 20 (such as progressing the data records between states) may be made using a Schema Dependent Database Access Tool 70. A Schema Dependent Database Access Tool 70 uses the schema rules to access the database. This tool is the tool that normal end-users would use to access the database. One example of such a tool is a defect tracking tool such as IBM® Rational® ClearQuest®. (IBM, Rational and ClearQuest are registered trademarks of International Business Machines Corporation in the United States and/or other countries.)

Figure 2A:
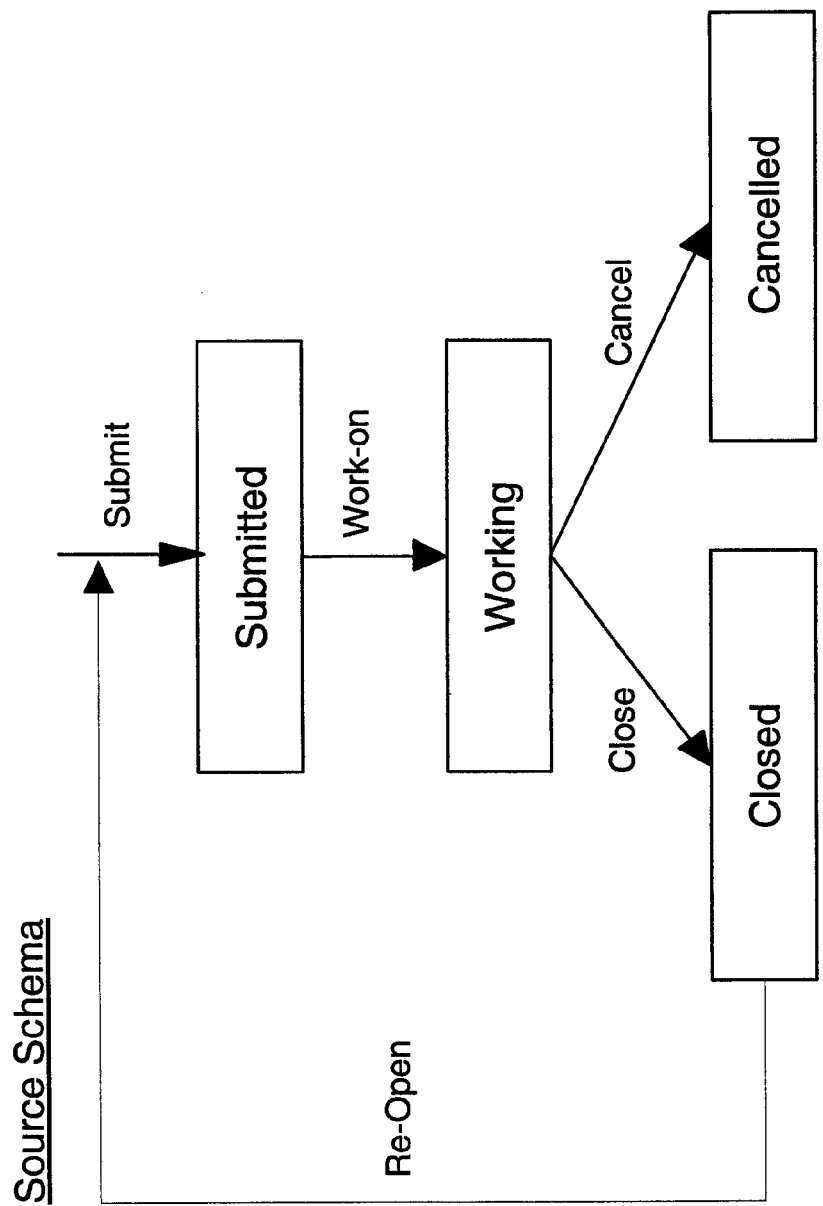
FIGS. 2a, 2b and 2c illustrate exemplary rules defining the workflow for source, interim and target schemas.

A simplified exemplary schema is shown in FIG. 2a. The source schema shown in FIG. 2a indicates that records may be in one of four states. A record may have been "submitted", the record may be being worked on ("working"), the record may have been "closed", or the record may have been "cancelled". In order to progress records between possible states, the source schema 30 defines certain actions which can be invoked using the Schema Dependent Database Access Tool 70. Thus for a record to be classed as "submitted", the "submit" action is performed. An action of "work-on", results in the "working" state, a "close" action closes a record and, finally, performing the "cancel" action, puts the record into the cancelled state.

At some point, a database administrator may desire to upgrade the database schema to a target schema 40. An exemplary target schema is shown in FIG. 2c. It can be seen from this figure that the "cancelled" state has been deleted and only the record states of "submitted", "working" and "closed" are now permissible.

Simply upgrading the database to the target schema of FIG. 2c is however extremely likely to cause data integrity problems. This is because cancelled records might well still exist in the database. Such records, in accordance with the new target schema, will no longer be valid.

The present invention, in accordance with the preferred embodiment, alleviates this problem by enabling the migration of invalid data records to a state that is valid in the new target schema.

The solution disclosed uses an interim schema to define a migration path between the source schema and the target schema. Modelling of all three schemas is performed using a modelling tool 60.

Figure 2B:
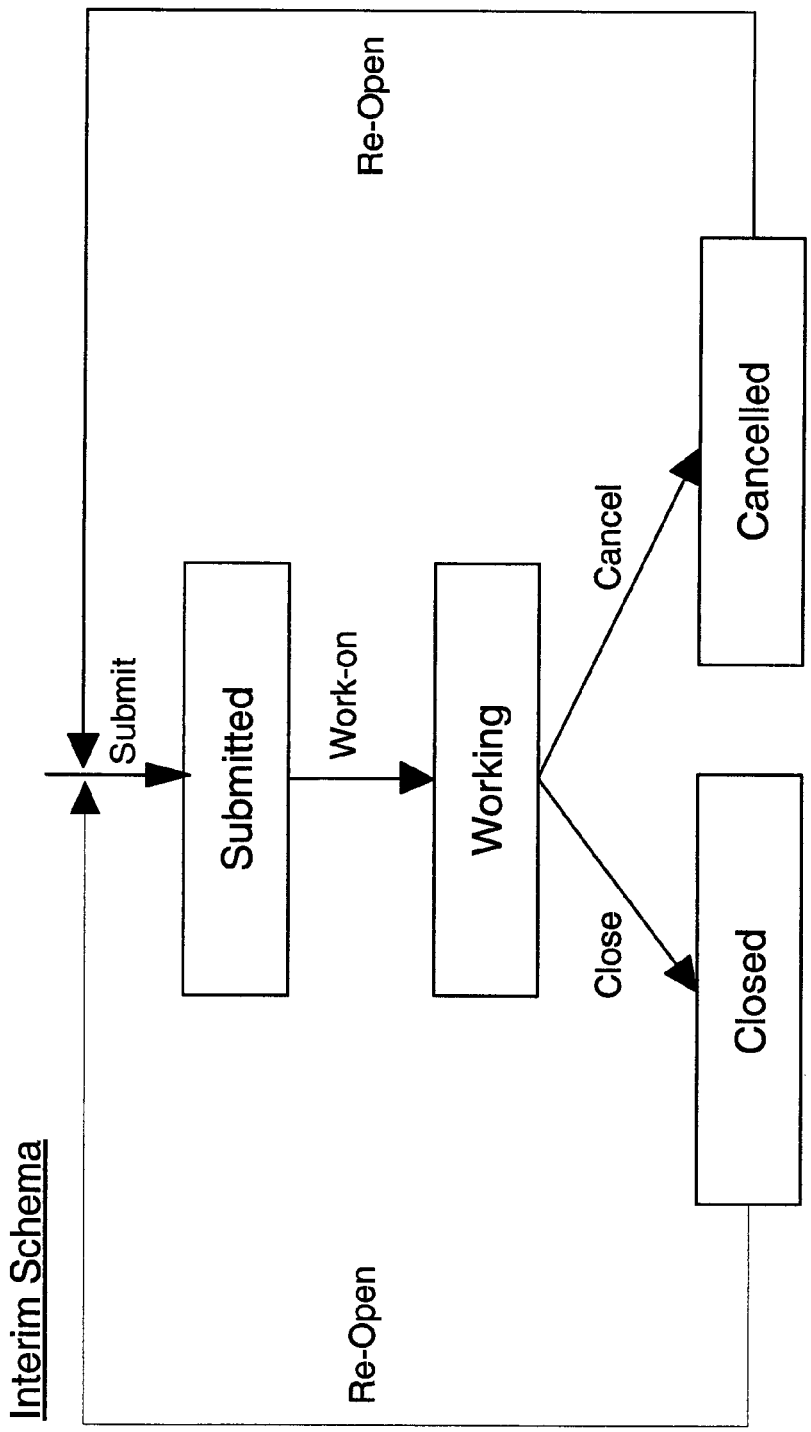
Figure 2C:
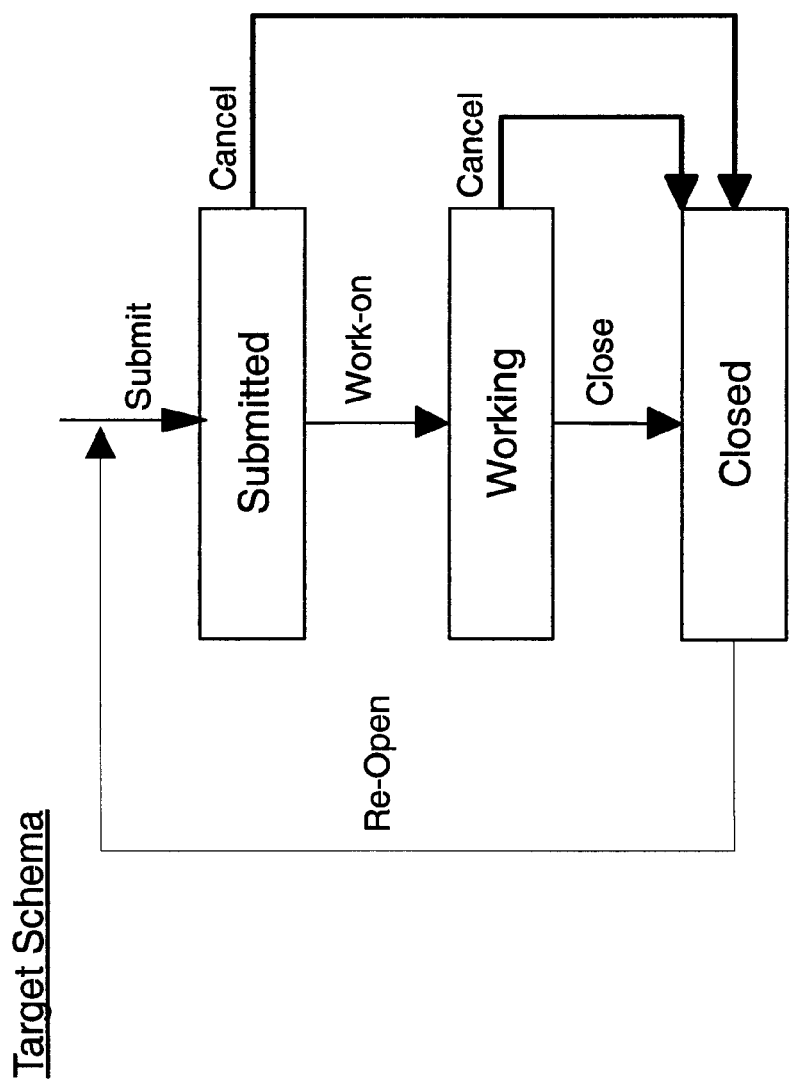

An exemplary interim schema is shown in FIG. 2b. As indicated above, the state of cancelled, is no longer permissible according to the target schema. The interim schema defines the action(s) to be applied to cancelled records in order to progress them to a state that is valid in the target schema. Thus the interim schema of FIG. 2b indicates that cancelled records can be re-opened and then submitted in order to move the record into the submitted state. Such records can then, for example, be progressed to the "closed" state using the "work-on" and "close" actions. As shown in FIG. 2c, in addition to deleting one or more states, the target schema may define new actions such as a cancel action to move a submitted record to the closed state and a cancel action to move a working record to the closed state.

There are several problems associated with simply removing a state (the redundant state) from a schema. For example, the redundant state may be actionless. In other words the redundant state may not have an action associated with it that enables progression from the redundant state to any other state, including the desired state. (Conversely, a non-actionless state does have an action to progress from that state to another state.)

In the example the "Cancelled" state is actionless, which means that even before it was deleted, there was no way for a "Cancelled" record to get to any other state. Even using a schema dependent database access tool there are no rules defined to advance any records in "Cancelled" state to another state. Therefore it is currently impossible to obey the rules of the schema when migrating a cancelled record to, for example, the state of "closed".

The present invention, in accordance with a preferred embodiment, solves this problem by creating an interim schema which includes the necessary rules to allow migration from the source schema to the target schema. In our example, this is achieved by defining a rule to allow a "Cancelled" record to move to the "Submitted" state.

Secondly, as alluded to above, the migration from the source to the target schema may abort if there are "Cancelled" records, that is records which are in a state that no longer exists in the new target schema.

Currently there are two approaches are possible to resolve this problem:

(1) The Schema Administrator needs to determine a strategy for dealing with "Cancelled" records before upgrading the database to the target schema. This needs to provide temporary, additional rules to allow "Cancelled" records to move to "Closed" state, which then needs to be executed before the original changes leading to the target schema can be applied.

(2) The System Administrator performing the database upgrade could use a non-schema dependent database access tool 80 to upgrade "Cancelled" records directly to "Closed" state. This approach assumes that the System Administrator knows that the records should be advanced to "Closed" state and not another state, such as "Working" state. Bypassing the schema rules in such a way also leads to activities not being performed (e.g. informing the record owner that their record is now closed, or sending an instruction to the test system to close the test case associated with the record, or updating an audit trail to indicate that the record has been moved to "Closed" state). Additionally, as no rule exists to allow a "Cancelled" record to advance directly to "Closed" state, the changes performed by the System Administrator would not support schema database integrity.

The present invention is particularly concerned with the deletion of a state from a database schema. However it should be appreciated that the solution disclosed does not preclude the possibility of other changes being made to the database schema (e.g. the insertion of a state and the update of an existing state).

Figure 6:
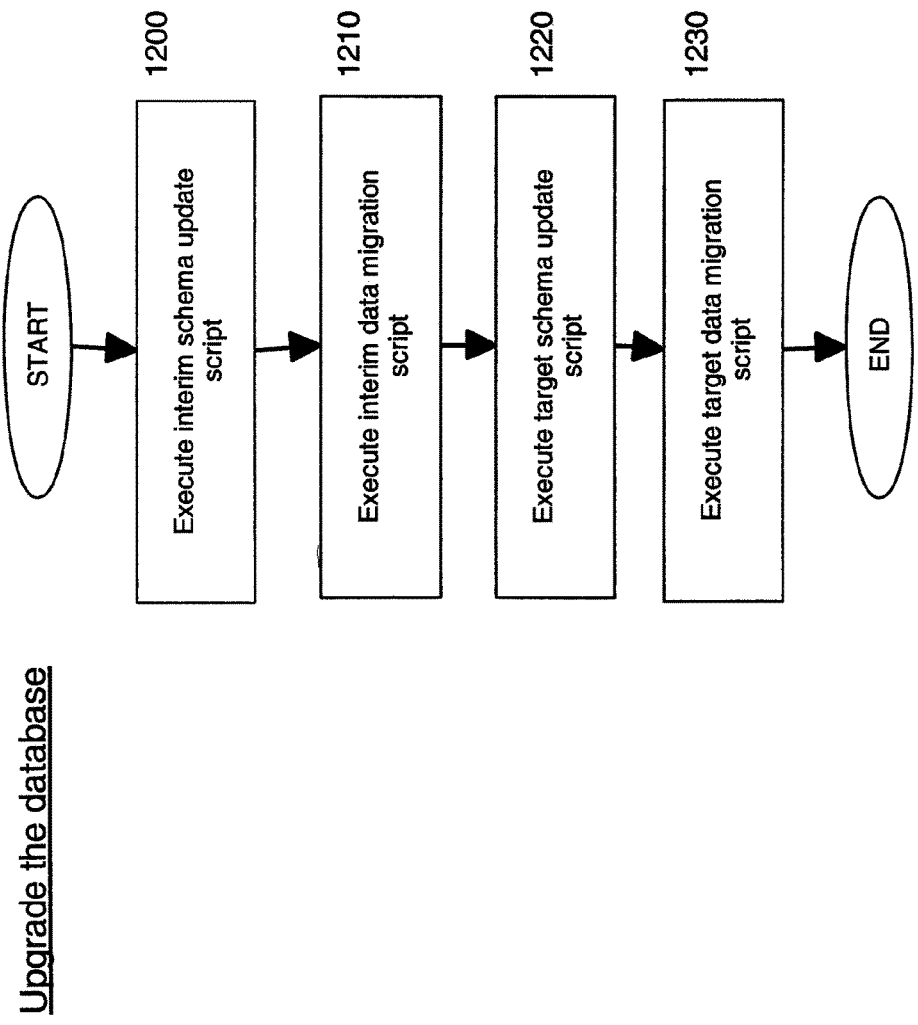
FIG. 6 shows, in accordance with a preferred embodiment of the present invention, the execution of the scripts used to update the schema rules and migrate database records.
Figure 7A:
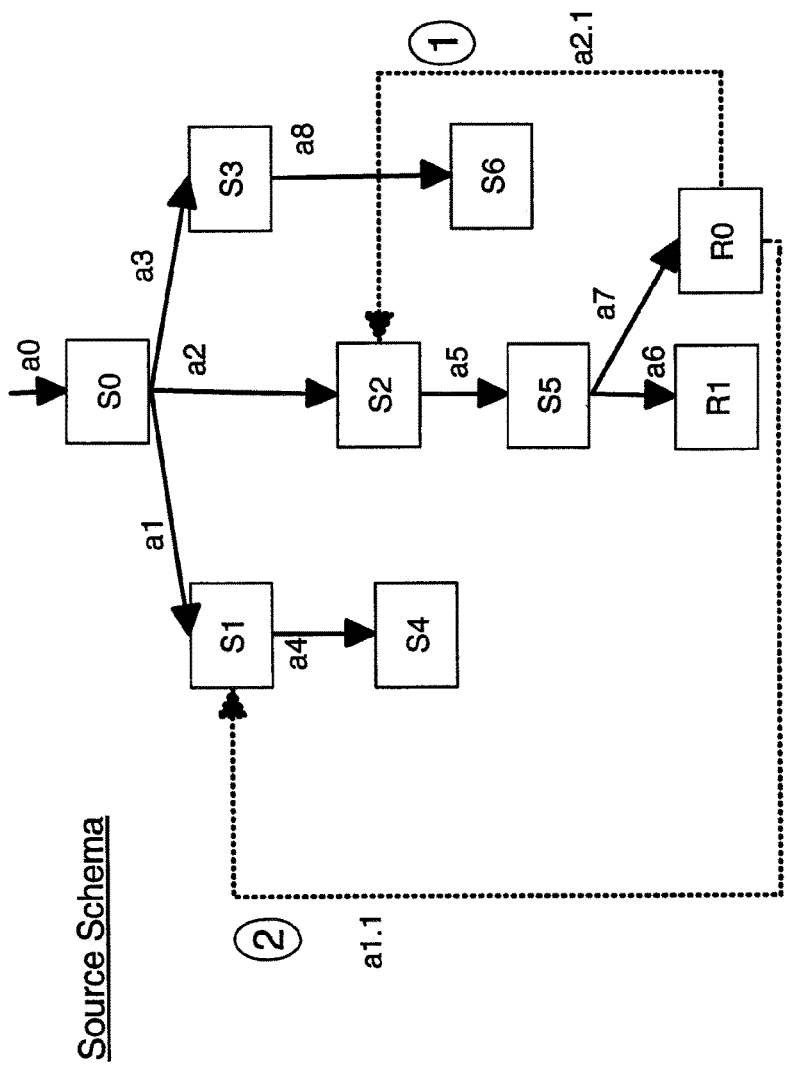
FIGS. 7a, 7b and 7c show more complex exemplary rules defining the workflow for source, interim and target schemas.

The solution of the preferred embodiment will now be described with respect to a more complicated state diagram (source schema) as shown in FIG. 7a, interim schema 7b, target schema 7c and the flow charts of FIGS. 3, 4a to 4k, 5a to 5c and FIG. 6.

The state to be deleted is known herein as the redundant state.

Four Examples will be discussed:

1) An action does not exist in the source schema to advance from the redundant (actionless) state to another state; consequently an action is selected to use and that action leads to a state which is part of a valid migration path;

2) An action exists to advance from the redundant state to another state which is part of a valid migration path;

3) An action does not exist which advances from the redundant state to another state; consequently an action is selected to use but that action leads to a state which is only part of an invalid migration path; and 4) An action exists to advance from the redundant state, but that action leads to a state which is part of an invalid migration path;

Example 1

Figure 3:
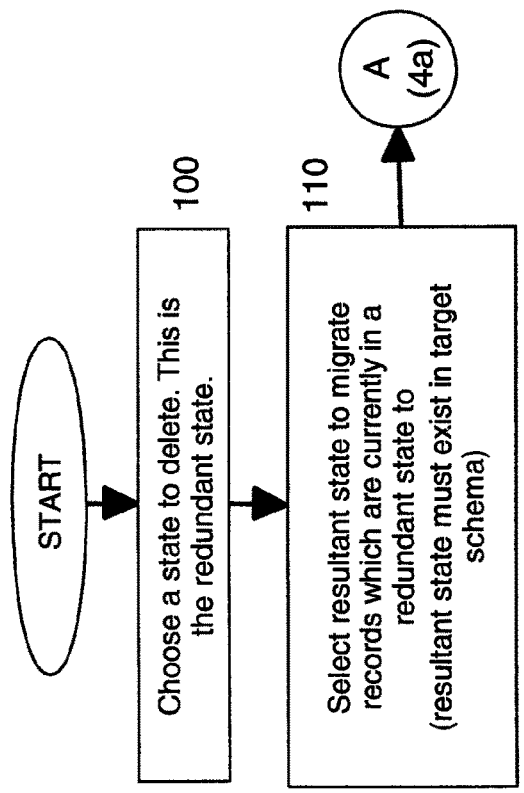
FIGS. 3, 4a to 4k shows the way in which one or more valid migration paths are calculated and presented to the user, in accordance with a preferred embodiment of the present invention.

As shown in FIG. 3, a state (the redundant state) is chosen for deletion from the source database schema of FIG. 7a (step 100). In the example, the redundant state is R0. A resultant state is chosen to which to migrate records that are currently in the deleted or redundant state to (step 110). The resultant state must be one that exists in the target schema of FIG. 7c. In the example, R1 is the chosen resultant state.

Figure 4A:
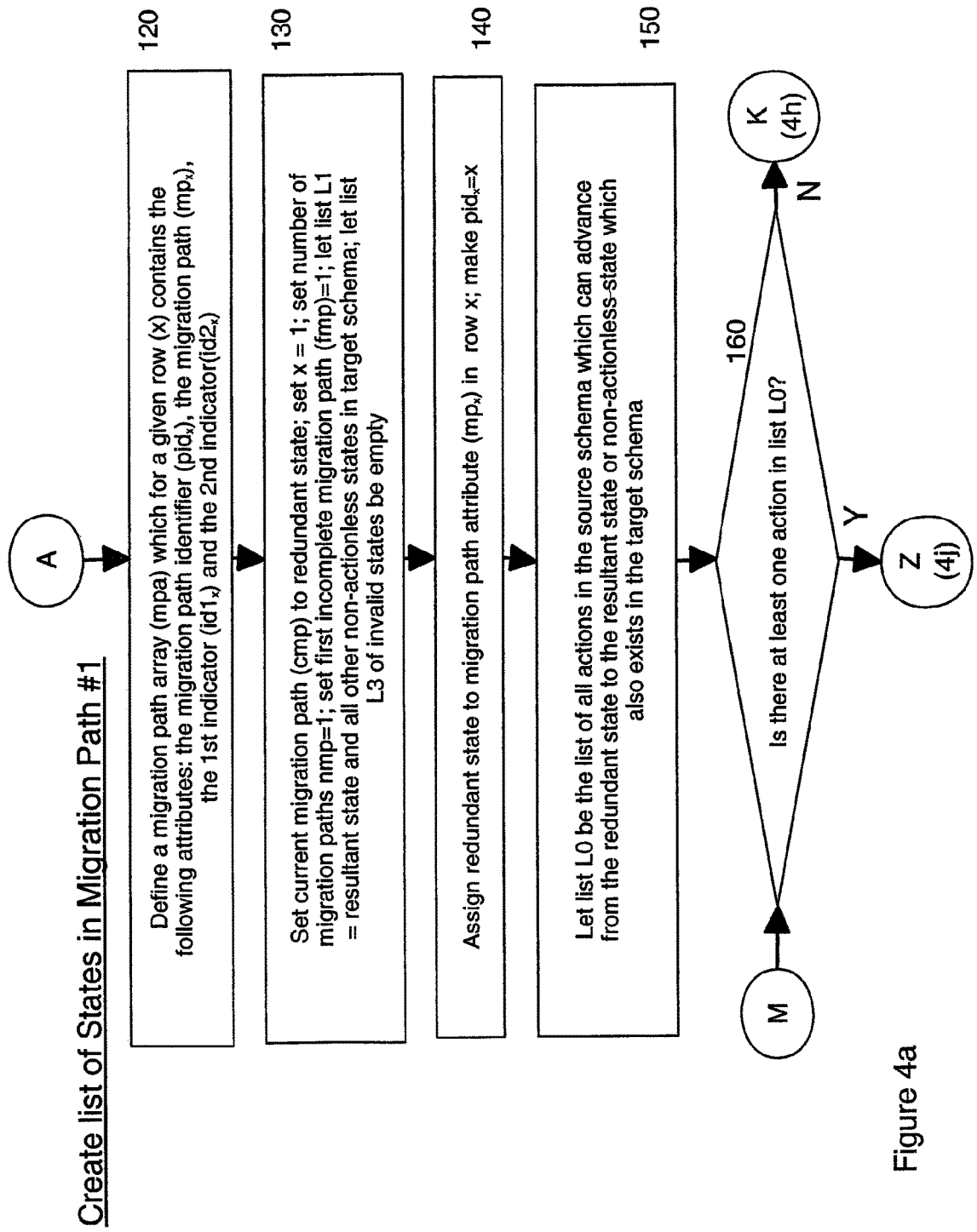

Processing then proceeds to FIG. 4a. The system defines at step 120 a migration path array (mpa) which for a given row (x) has four attributes: a path identifier ($pid_x$); a migration path ($mp_x$); a first indicator ($id1_x$); and a second indicator ($id2_x$). The meaning of these attributes will become clear shortly.

The system sets up various variables (at step 130) for use during processing. These are as follows:

A current migration path (cmp) variable is set to the redundant state, R0;

x is the current row in the migration path array (mpa) being processed and is initialised to 1;

A number of migration paths (nmp) variable identifies the number of rows in the array and is initialised to 1;

A first incomplete migration path (fmp) is set to 1. This allows the system to keep track of the first row in the migration path array which has its first indicator set to incomplete;

List L1 includes the resultant state and all other non-actionless states in target schema; and List L3 of invalid states is empty. L3 indicates which states do not lead to a valid migration path.

The way in which these variables are used will become clear.

At step 140, the redundant state is assigned to the migration path attribute in row x ($mp_x$). The path id in the same row ($pid_x$) is also made equal to x.

| Path Id | Migration Path | 1st Indicator | 2nd Indicator |
|---|---|---|---|
| 1 | R0 | | |

Step 150 dictates that list L0 is then populated with all the actions in the source schema which can be advanced from the redundant state to the resultant state or a non-actionless state which also exists in the target schema.

In this example, the redundant state R0 does not have any actions which advance that state as dictated above. Thus processing moves from the test performed at step 160 to FIG. 4h.

At step 750 it is determined whether the second indicator is set. It isn't and so all states in L1 are presented to the user at step 760 who then selects a state at step 770. In the example, the user selects S0. All actions in the target/source schema are presented which result in the selected state (step 780). In this example a0 is the only relevant action and so the user selects this at step 790. The selected state and action are then added to the current migration path variable and also to row the migration path attribute in row x ($mp_1$) of the mpa at step 800.

It is determined at step 810 that S0 is not the resultant state and so the first indicator for row x ($id_x$) is set to incomplete (I) in row 1 (see below):

| Path Id | Migration Path | 1st Indicator | 2nd Indicator |
|---|---|---|---|
| 1 | R0-a0-S0 | I | |

Figure 4B:
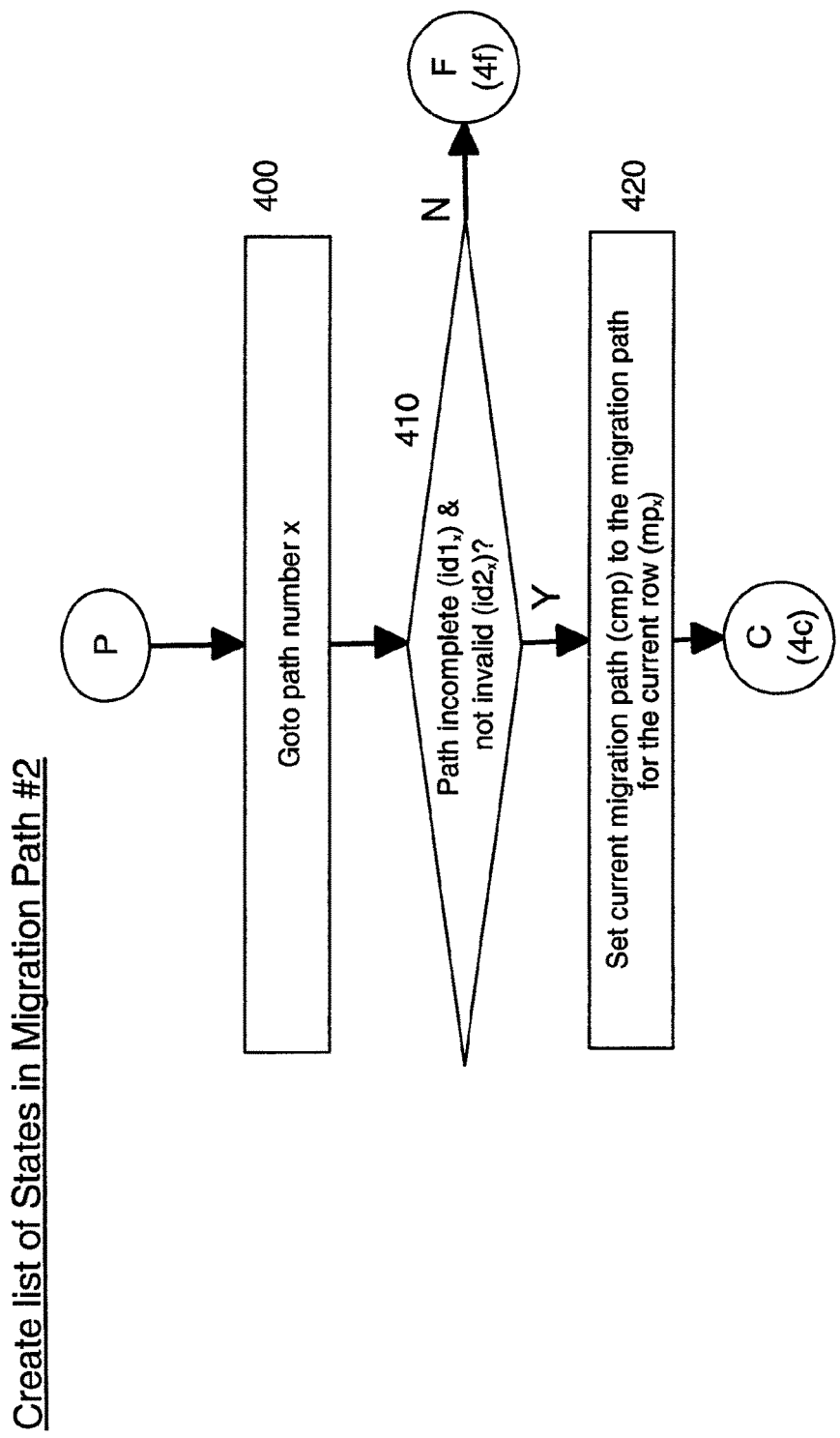

The system advances to row x (1) in the migration path array at step 400 of FIG. 4b. It is determined at step 410 whether this path is marked as incomplete and not invalid. The first indicator indicates whether a migration path is Complete (C) or Incomplete (I). A migration path is complete when it ends with the resultant state (in which case the second indicator is set to Valid) or it is not possible to reach the resultant state (in which case the second indicator is set to Invalid).

As indicated above, the migration path with a path id of 1 ($mp_1$) is incomplete and it is not marked as invalid. Consequently, the cmp is set to the migration path for the current row (step 420). Thus the cmp now reads R0-a0-S0.

Figure 4C:
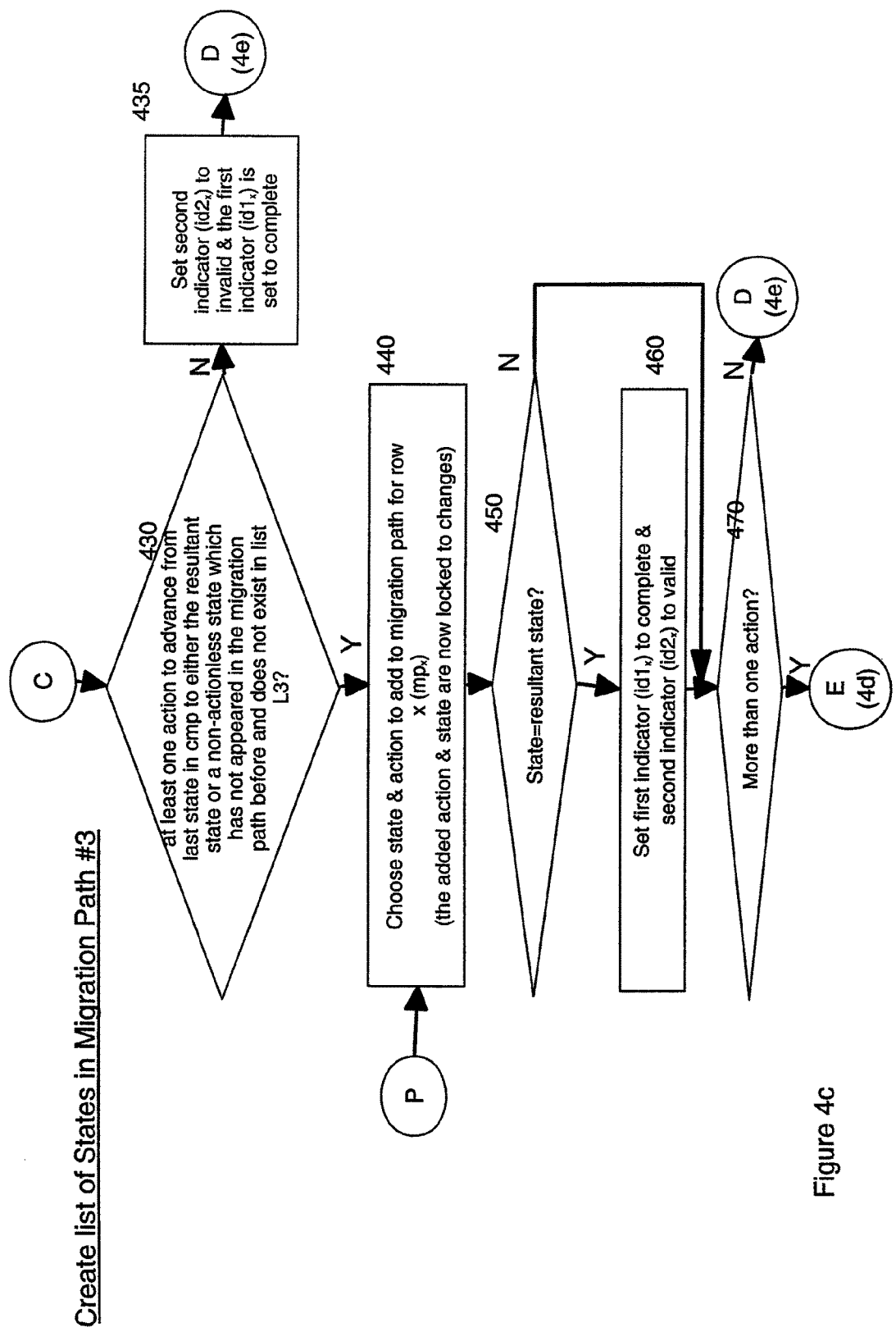

At step 430 of FIG. 4c, it is determined whether there is at least one action to advance from the last state in the current migration path (S0) to either the resultant state or a state which is:

(i) Non-actionless; and
(ii) Has not appeared in the migration path before. This ensures that migration path does not involve an infinite loop; and
(iii) Does not exist in L3. L3 is currently empty and lists the states which cannot lead to a valid migration path.

As L3 is currently empty and it is possible to advance from S0 to either state S1, S2 or S3, the user may choose one such state (e.g. S3) and an associated action to be added to the migration path attribute for row x ($mp_x$; step 440). Note that the added state and action are now locked to changes.

| Path Id | Migration Path | 1st Indicator | 2nd Indicator |
|---|---|---|---|
| 1 | R0-a0-S0-a3-S3 | I | |

As this is not the resultant state, it is determined whether there is more than one action to advance from state S0 to another state (step 470).

Figure 4D:
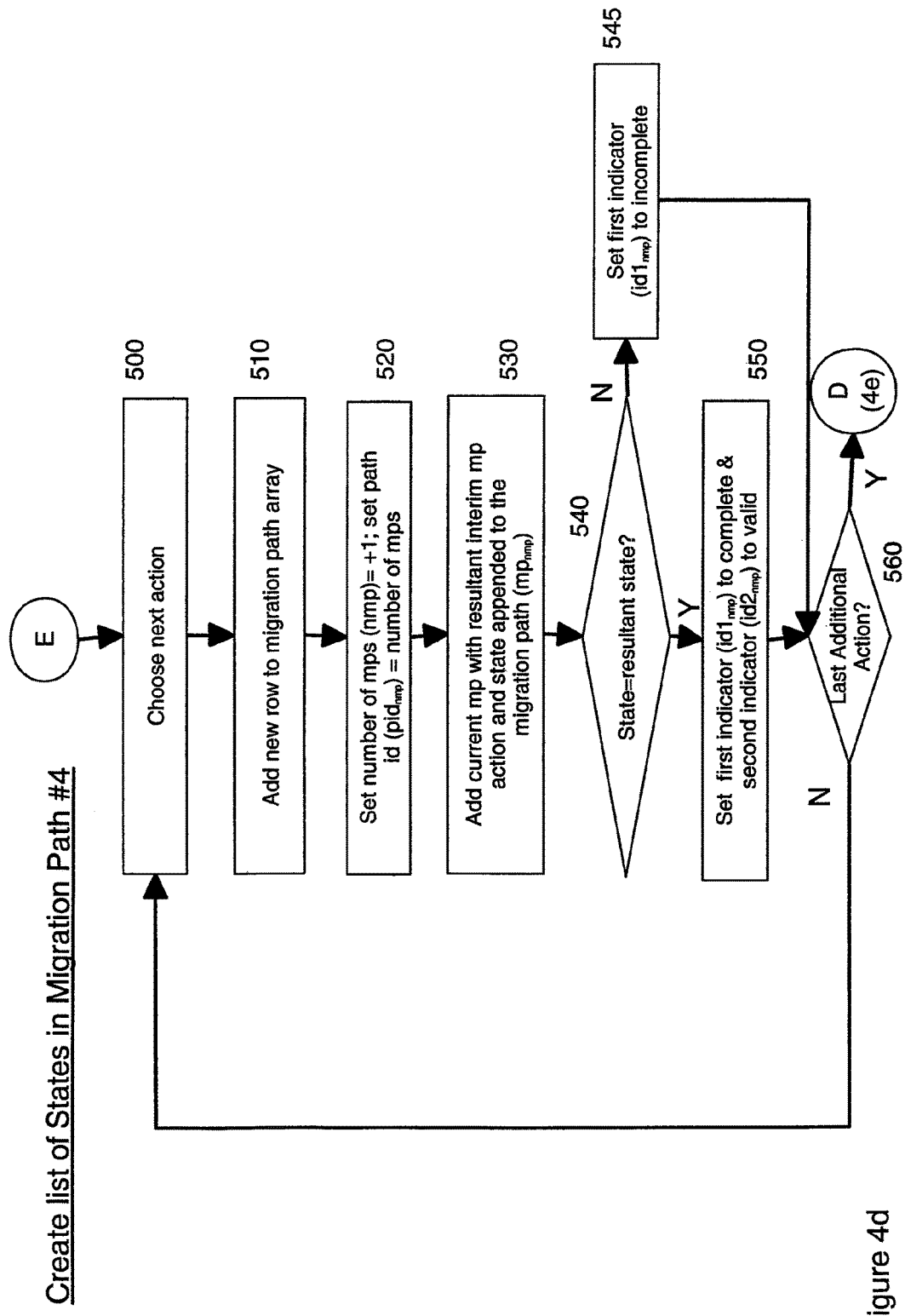

The next action is chosen (a1) by the system at step 500 of FIG. 4d and a new row is added to the migration path array at step 510.

At step 520, the number of migration paths is incremented by 1 (nmp=2) and the path id for the row which equals the number of migration paths ($pid_{nmp}$) is set to be the same as the number of migration paths (path $id_{nmp}$ therefore=2).

At step 530, the cmp value (R0-a0-S0) is added to the migration path attribute of row 2 ($mp_{nmp}$) of the migration path array with action chosen at step 500 and the resultant interim migration state (S1). It is then determined at step 540 whether the resultant state has been reached. Since the answer is no, the first indicator for row 2 ($id1_{nmp}$) is also set to I (step 545).

| Path Id | Migration Path | 1st Indicator | 2nd Indicator |
|---|---|---|---|
| 1 | R0-a0-S0-a3-S3 | I | |
| 2 | R0-a0-S0-a1-S1 | I | |

A step 560, it is determined whether there are any additional actions that will progress from state S0. In this instance, there is one final additional action, a2.

The next action is chosen at step 500 and a new row is added to the migration path array at step 510. The number of migration paths variable is incremented to 3 and the path id for row 3 ($pid_{nmp}$) is set to 3 also (step 520). The current migration path is added with the resultant interim migration path (S2) and action appended (step 530). As S2 is not the resultant state, (step 540), the first indicator is set to incomplete (step 545):

| Path Id | Migration Path | 1st Indicator | 2nd Indicator |
|---|---|---|---|
| 1 | R0-a0-S0-a3-S3 | I | |
| 2 | R0-a0-S0-a1-S1 | I | |
| 3 | R0-a0-S0-a2-S2 | I | |

A test is performed at step 560 to determine whether a2 was the last additional action. Since the answer is yes, processing proceeds to FIG. 4e.

Figure 4E:
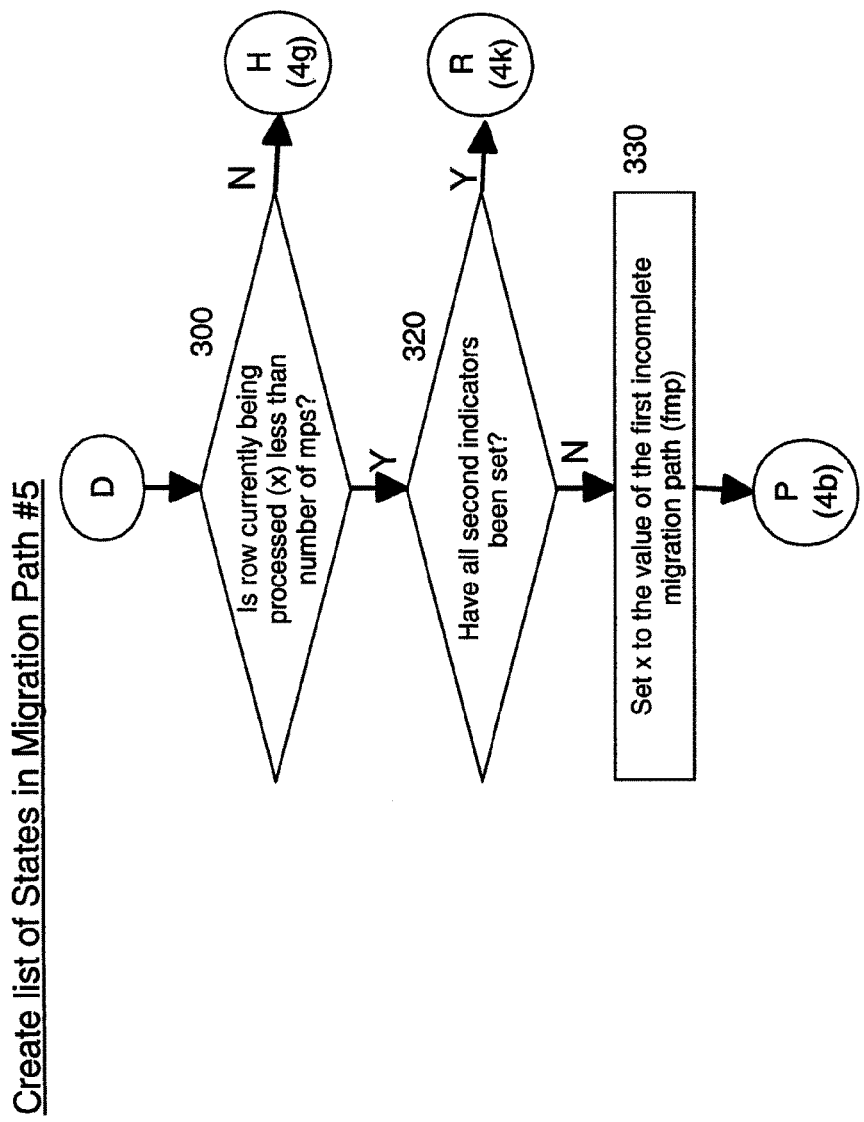

At step 300 of FIG. 4e, it is determined whether the row currently being processed (x;1) is less than the number of migration paths (nmps). As the nmps is currently 3, whilst x is 1, the answer is yes. Consequently, because all the second indicators have not been set (step 320), x is set at step 330 to the value of the first incomplete migration path (fmp) as denoted by an indication of I in the id1 column—in this instance 1. The system then advances to this row at step 400 of FIG. 4b.

As the migration path in row 1 is incomplete and not invalid (step 410), the cmp is set to the migration path for the current row (i.e. R0-a0-S0-a3-S3). At step 430 (FIG. 4c), it is determined whether there is at least one action to advance from the last state in the current migration path (S3) of row x (1) to either the resultant state or a non-actionless state which has not appeared in the migration path before and does not exists in list L3. In this instance, the answer is no.

This is because the current state in row x is S3. The only advancement from S3 is to S6 which is actionless as opposed to non-actionless. For this reason the second indicator is set to invalid and the first indicator to complete at step 435 and processing progresses to FIG. 4*e*:

| Path Id | Migration Path  | 1st Indicator | 2nd Indicator |
|---------|-----------------|---------------|---------------|
| 1       | R0-a0-S0-a3-S3  | C             | I             |
| 2       | R0-a0-S0-a1-S1  | I             |               |
| 3       | R0-a0-S0-a2-S2  | I             |               |

At step 300, it is determined whether the row currently being processed x is less than the nmps. Since x is still 1, the answer is yes. All second indicators have not yet been set (step 320) and so x is set to 1 (the row containing the first incomplete migration path) at step 330.

At step 400 of FIG. 4*b*, the system moves to row 1. Since the path is incomplete and also invalid (step 410), processing proceeds to FIG. 4*f*, where it is determined at step 600 whether x equals the number of migration paths identified (i.e. 3). X is still 1 and therefore the answer is no. At step 605 if the fmp has the same value as x (it does in this case) then 1 is added to the fmp. Fmp is therefore now 2. The row being processed, x, at step 610 is incremented to 2.

The system advances to row x (2) at step 400 and as this path is incomplete and not invalid (step 410), the current migration path is set to the migration path for the current row (i.e. R0-a0-S0-a1-S1) at step 420.

It is determined at step 430 of FIG. 4*c* whether there is at least one action to advance from the last state in the migration path (S1) to either the resultant state or a non-actionless state which has not appeared in the migration path before and which does not exist in list L3. The answer is no because the only additional action to advance from S1 is a4 which leads to actionless state S4.

At step 435, the second indicator of row 2 is also set to invalid and the first indicator is set to complete:

| Path Id | Migration Path  | 1st Indicator | 2nd Indicator |
|---------|-----------------|---------------|---------------|
| 1       | R0-a0-S0-a3-S3  | C             | I             |
| 2       | R0-a0-S0-a1-S1  | C             | I             |
| 3       | R0-a0-S0-a2-S2  | I             |               |

It is determined at step 300 that the row currently being processed (row 2) is less than the number of migration paths identified which is 3. Since all second indicators have not been set (step 320), x is set to the value of the fmp 2 at step 330 (FIG. 4*g*)—i.e. 2.

Figure 4F:
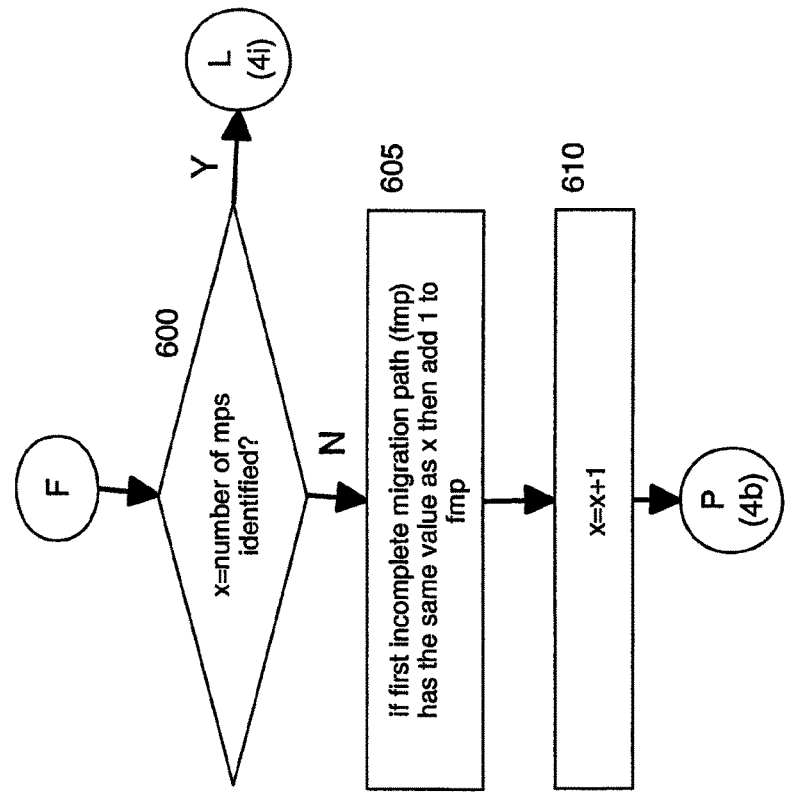

The system moves to migration path 2 and since the test at step 410 is false, processing proceeds to FIG. 4*f*. X does not equal the number of migration paths identified (step 600). The fmp now has the same value as x and so the fmp is incremented by 1 (to 3) at step 605. X is also incremented to 3 (step 610).

The system moves to path 3 (step 400, FIG. 4*b*) and since the path is incomplete and not invalid (step 410), the current migration path is set to the migration path for the current row (R0-a0-S0-a2-S2) at step 420.

It is determined at step 430 of FIG. 4*c* whether there is at least one action to advance from the last state in the migration path to either the resultant state or a non-actionless state which has not appeared in the migration path before and does not exist in list L3. In this instance there is, a5 and so this action is chosen and is added along with the resulting state S5 to the migration path for row 3 (step 440). The added action and state and now locked to changes.

| Path Id | Migration Path        | 1st Indicator | 2nd Indicator |
|---------|-----------------------|---------------|---------------|
| 1       | R0-a0-S0-a3-S3        | C             | I             |
| 2       | R0-a0-S0-a1-S1        | C             | I             |
| 3       | R0-a0-S0-a2-S2-a5-S5  | I             |               |

S5 is not the resultant state (step 450) and there is only the one action to advance to S5 (step 470), thus processing proceeds to FIG. 4*e* where it is determined whether the row currently being processed is less than the number of migration paths identified (step 300). The answer is no and so x is set to the value of fmp which is 3.

The system then moves to row 3 (step 400, FIG. 4*b*). At step 410 of FIG. 4*b*, it is determined that that the path is incomplete and not invalid. The current migration path is thus set at step 420 to the migration path for the current row (R0-a0-S0-a3-S2-a5-S5)

It is determined at step 430 that action a6 will advance from state S5 to R1. This action and state are chosen (step 440) and are added to the migration path for row 3.

This time the state R1 is the resultant state (step 450) and so the first indicator for the current row (id1$_x$) is set to complete and the second indicator (id2$_x$) is set to valid (step 460):

| Path Id | Migration Path              | 1st Indicator | 2nd Indicator |
|---------|-----------------------------|---------------|---------------|
| 1       | R0-a0-S0-a3-S3              | C             | I             |
| 2       | R0-a0-S0-a1-S1              | C             | I             |
| 3       | R0-a0-S0-a2-S2-a5-S5-a6-R1  | C             | V             |

There is not more than one action (step 470) and the row being processed (3) is equal to the number of migration paths identified (step 300). X is thus set to the value of fmp 3 at step 310 of FIG. 4*g*.

Processing moves to migration path 3 (step 400, FIG. 4*b*) and it is determined at step 410 that as this row's migration path is complete and valid, processing should move to FIG. 4*f*. X now equals the number of migration paths identified (step 600) and so it is determined at step 700 whether there is at least one valid migration path to present to the user. The answer is yes and so this migration path is presented to the user at step 910 and processing ends.

The above applies when an action does not exist to advance a record directly from the redundant state but there is a valid migration path.

It should be appreciated that a special form of example one is where the user selects to progress straight from the redundant state to the resultant state. This results a positive test at step 810 and consequently the processing of step 820 is performed.

Example 2

Dotted line 1 in FIG. 7*a* indicates the example in which an action does exist to migrate from the redundant state to a valid migration path:

The user chooses the same redundant state for deletion R0 and the same resultant state R1 at steps 100, 110.

Once again, a migration path array (mpa) is defined at step 120 and the same variables are initialised as before at step 130. The redundant state 140 is assigned to the migration path attribute in mpa$_x$, row 1, and the path id (pid$_x$) is set to 1 also. List L0 is set to the list of all actions in the source schema which can advance from the redundant state to the resultant state or non-actionless state which also exists in the target schema (step 150). In this example, L0 includes action a2.1. This time around the test at step 160 is true. Step 200 of FIG. 4j dictates that all states which can be reached by all actions in list L0 should now be listed. In this example, the only state to be listed is S2. Thus state S2 is chosen at step 210 and is appended along with its associated action in list L0 to both the current migration path and the migration path (mp$_x$) for row x. The action by which S2 is reached from the redundant state is also added to both the cmp and also the row. Since S2 is not the resultant state (step 220), the first indicator is set to incomplete in row 1:

| Path Id | Migration Path | 1st Indicator | 2nd Indicator |
| --- | --- | --- | --- |
| 1 | R0-a2.1-S2 | I | |

Should the state chosen have been the resultant state, the first indicator would have been set to complete and the second indicator to valid in the first row (step 235).

There is only one action in list L0 and so processing proceeds from step 240 to FIG. 4e. The row currently being processed is not less than the number of migration paths identified (step 300) and so processing now moves to FIG. 4g where x is set to 1 which is the value of the fmp (step 310). The system moves to row 1 (step 400 of FIG. 4b) and it is determined that the path is incomplete and not invalid at step 410. The current migration path is set to R0-a2.1-S1 at step 420.

At step 430, it is determined that action a5 advances state S2 to state S5. S2 and a5 are therefore chosen and added to the migration path for row 1. The added action and state are now locked to changes.

| Path Id | Migration Path | 1st Indicator | 2nd Indicator |
| --- | --- | --- | --- |
| 1 | R0-a2.1-S2-a5-S5 | I | |

S5 is not the resultant state (step 450) and there is only one action to progress from S2 to S5 (step 470), consequently processing proceeds to FIG. 4e.

At step 300 a determination is made as to whether x (1) is less than the number of migration paths identified (1). As the answer is no, processing moves to FIG. 4g where x is set to 1 (step 310).

The system moves to row 1 (step 400) and it is determined that the path is incomplete and not invalid at step 410. Consequently the current migration path is set to the migration path for the current row (R0-a2.1-S2-a5-S5) at step 420.

It is determined at step 430 (FIG. 4c) that action a6 advances state S5 to the resultant state. a6 and R1 are therefore chosen and added to row x at step 440. R1 is the resultant state (step 450) and so the first indicator is set to complete and the second indicator to valid:

| Path Id | Migration Path | 1st Indicator | 2nd Indicator |
| --- | --- | --- | --- |
| 1 | R0-a2.1-S2-a5-S5-a6-R1 | C | V |

There is only one action to advance from S5 to the resultant state or a non-actionless state (step 470) and so processing proceeds to FIG. 4e. X is not less than the number of migration paths (step 300) and so x is set to 1 at step 310 of FIG. 4g. Note that the fmp still reads 1 even though the first row is now marked as complete. The system moves to row 1 (step 400) and this time the determination at step 410 is false. The number of migration paths is equal to x (step 600) and so it is determined at step 700 whether there is at least one valid migration path to present to the user. These are then presented to the user to the user (step 910) and processing ends.

Example 3

Figure 7B:
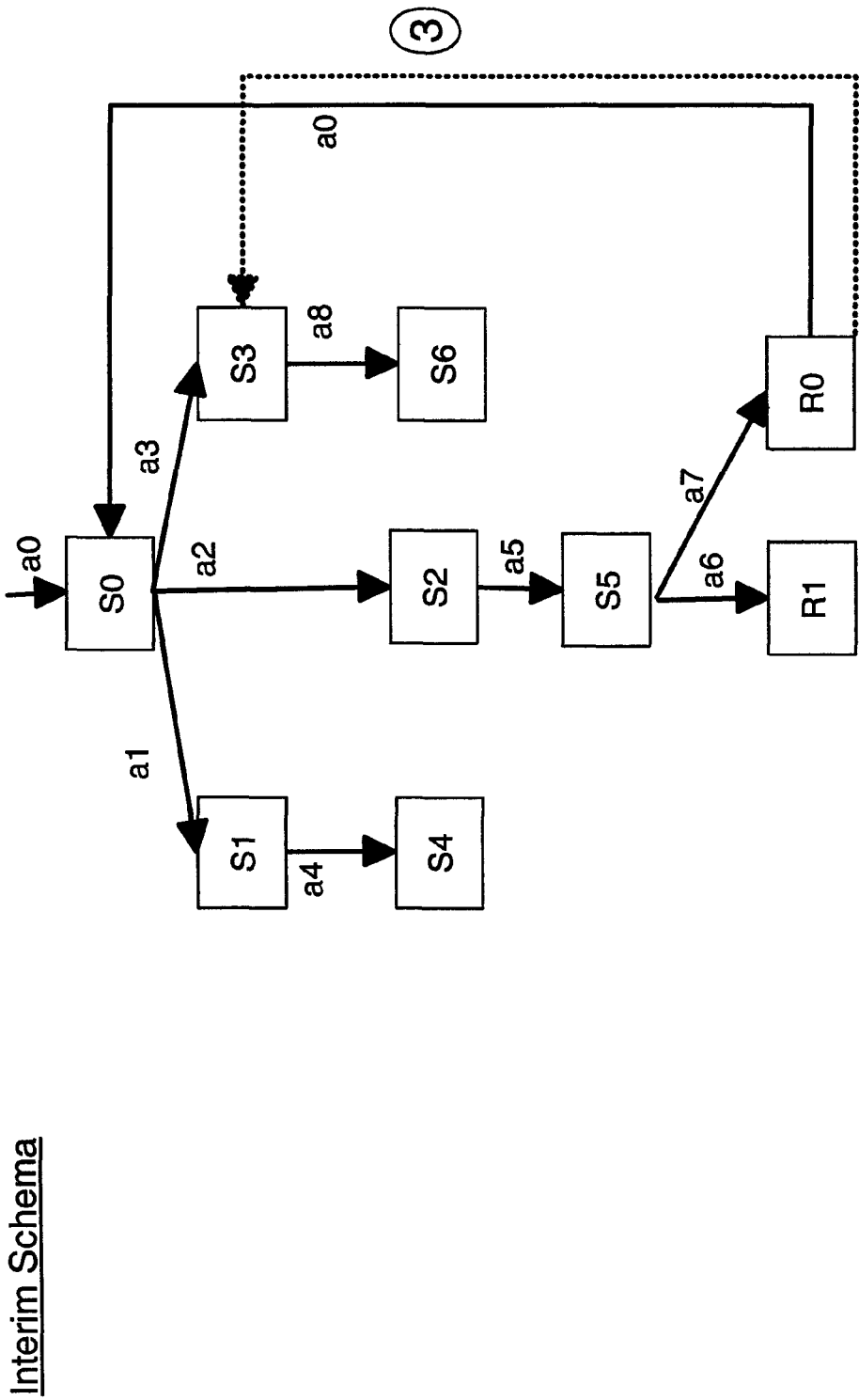

In this example, an action does not exist to advance from the redundant state, and the action selected does not lead to a valid migration path. This is indicated by dotted line 3 in FIG. 7b.

Figure 4G:
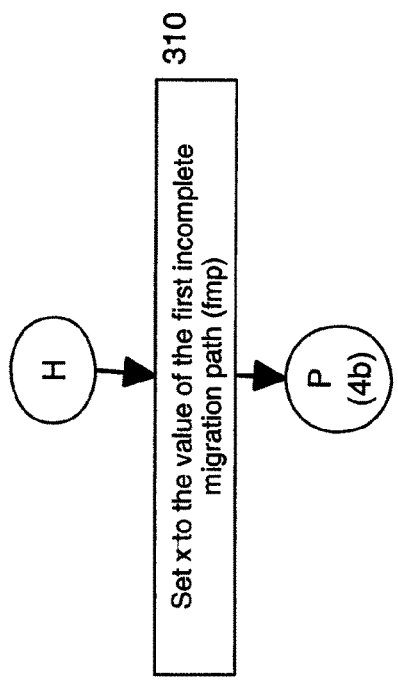
Figure 4H:
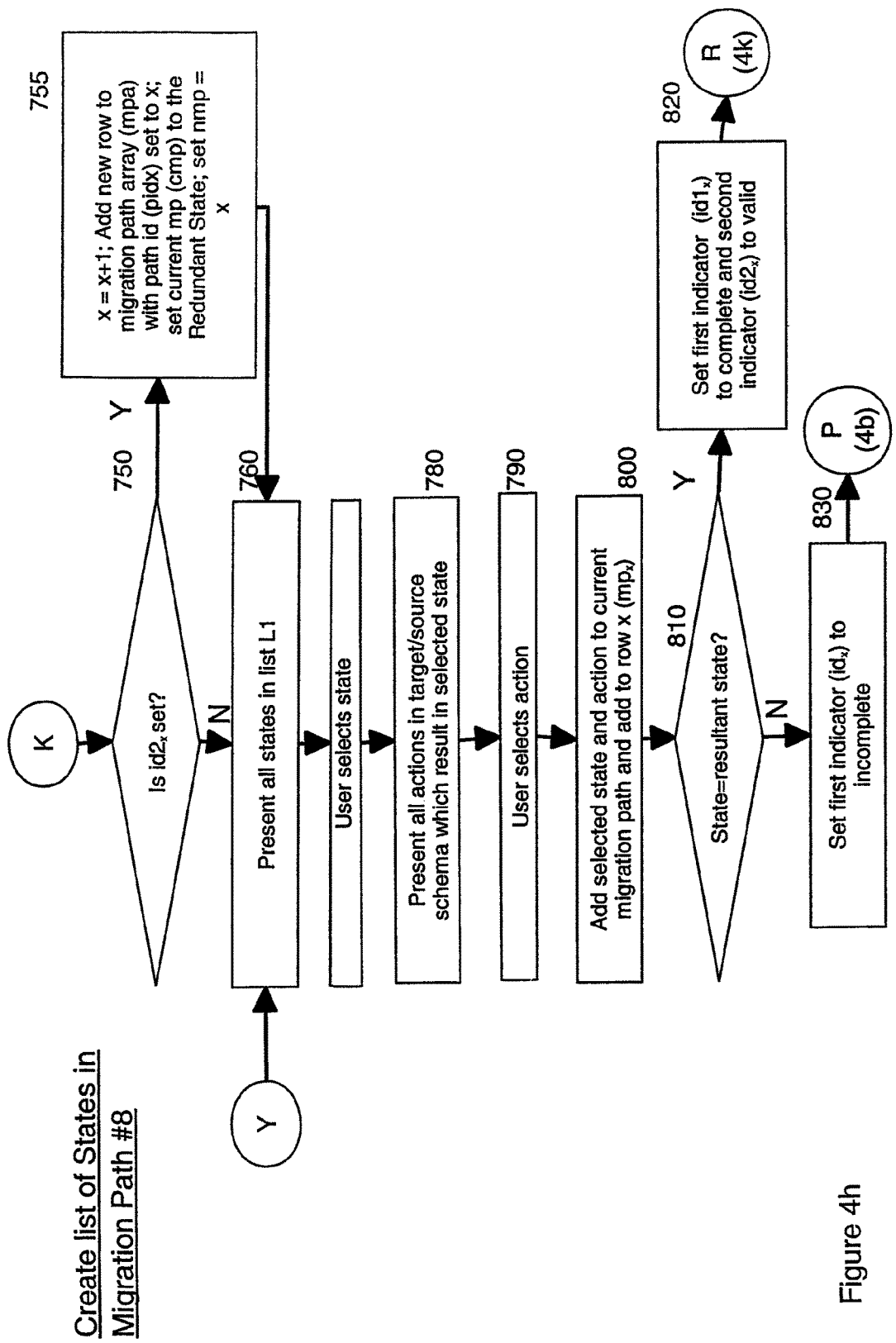
Figure 4I:
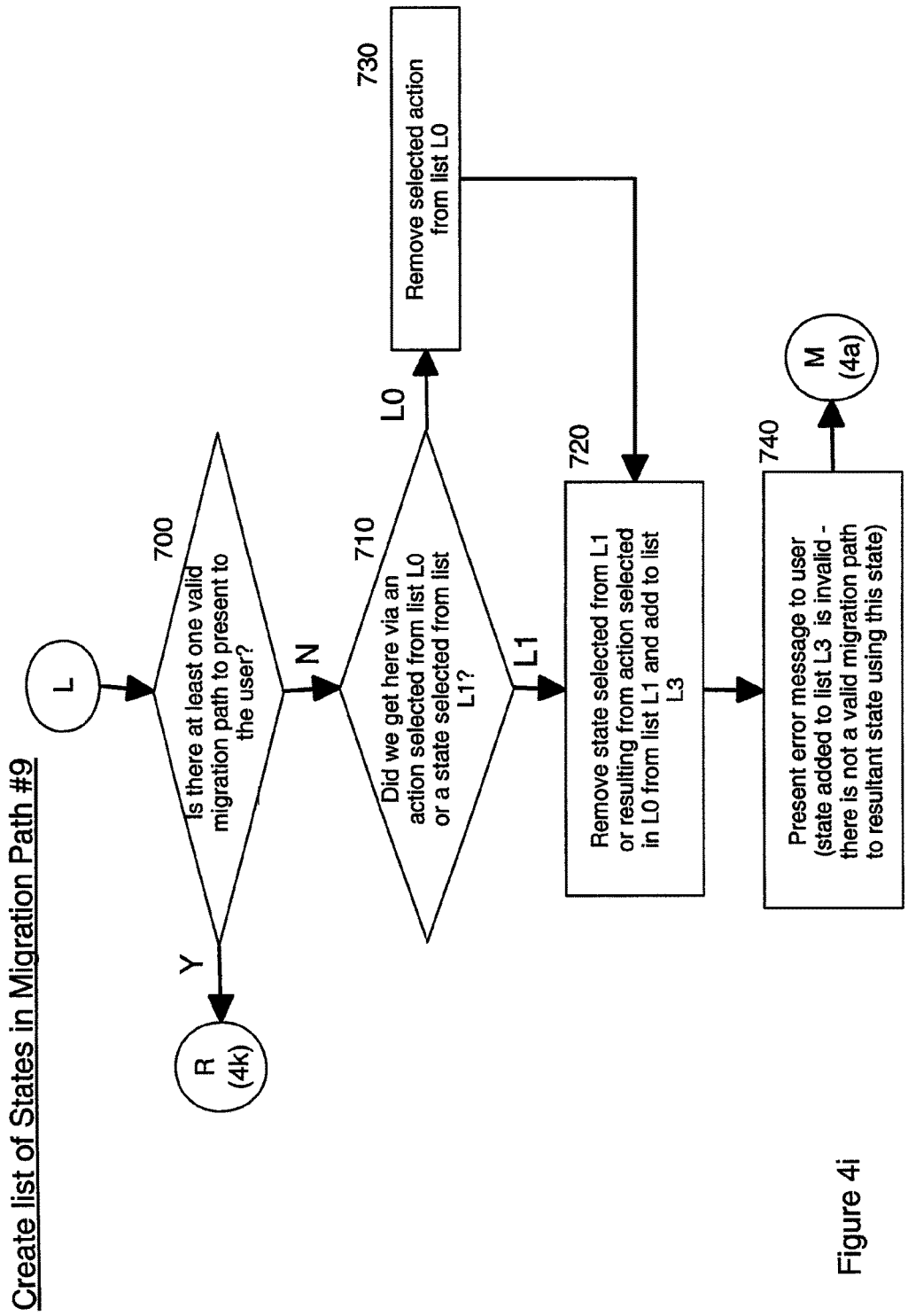
Figure 4J:
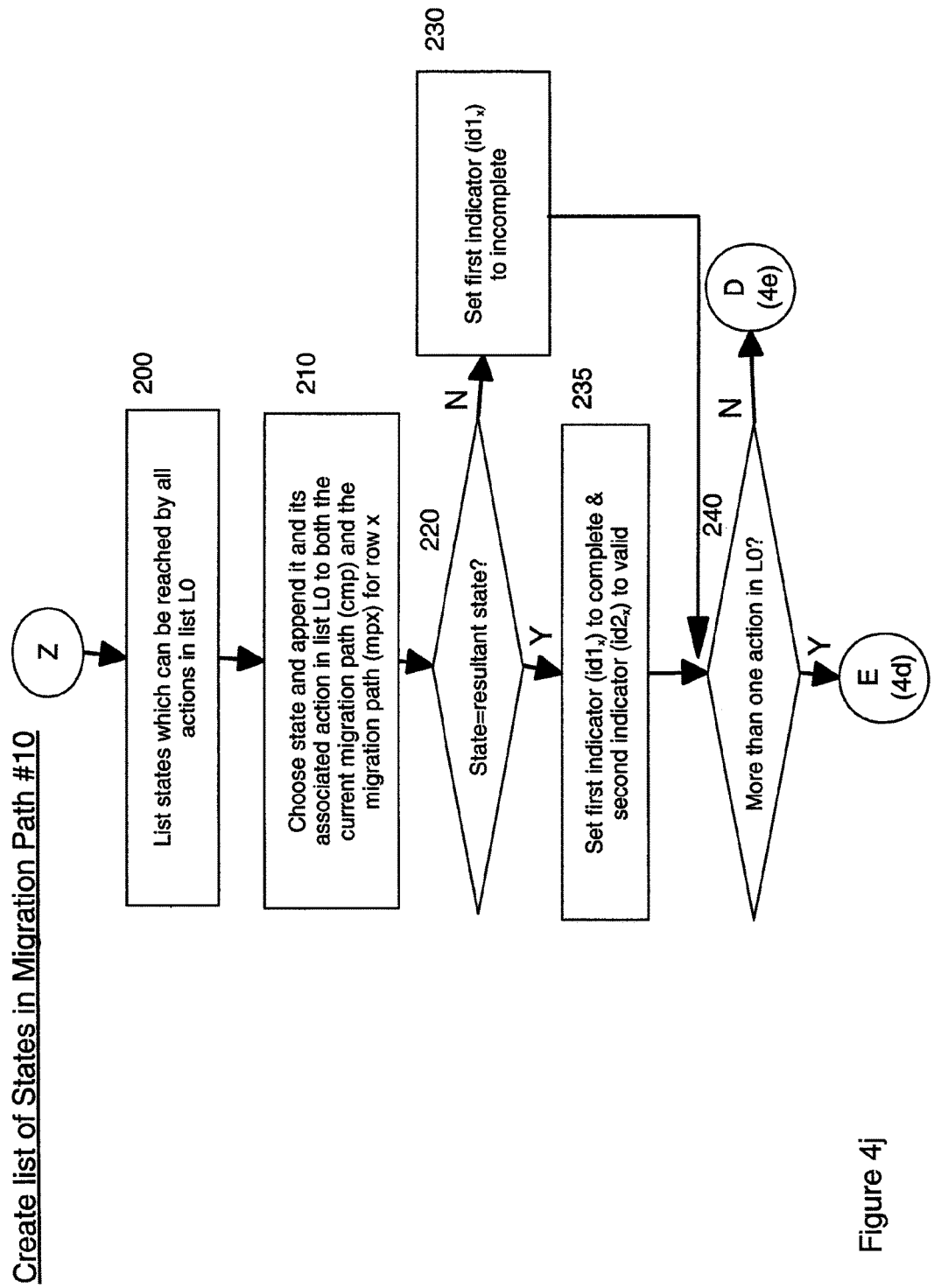
Figure 4K:
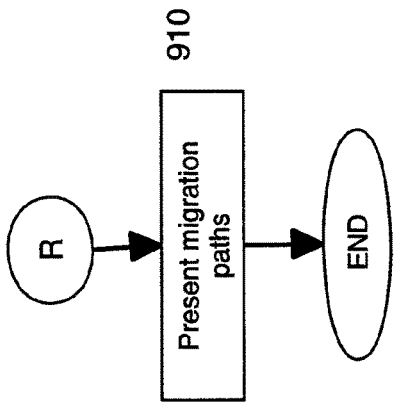

There are no actions in List L0 (step 160) and so processing proceeds to FIG. 4h, step 750. The second indicator in row 1 is not set and so all states in list L1 are presented (this list was initialised at step 130 of FIG. 4a). In this example, the user selects state S3 (step 770) and all actions which can result in S3 are presented—i.e. a3 (step 780). a3 is selected by the user at step 790 and the state and action are added to the current migration path and the mp attribute of row 1 (step 800). State S3 is not the resultant state (step 810) and so the first indicator in row x is set to incomplete at step 830:

| Path Id | Migration Path | 1st Indicator | 2nd Indicator |
| --- | --- | --- | --- |
| 1 | R0-a3-S3 | I | |

The system then advances row 1 of FIG. 4b (step 400). The path is incomplete and not invalid (step 410). The current migration path is set to the migration path for the current row—i.e. R0-a3-S3 at step 420. The determination at step 430 (FIG. 4c) is false. Consequently the second indicator is set to invalid and the first indicator is set to complete (step 435):

| Path Id | Migration Path | 1st Indicator | 2nd Indicator |
| --- | --- | --- | --- |
| 1 | R0-a3-S3 | C | I |

The row currently being processed (row 1) is not less than the number of migration paths (step 300) and so x is set to 1 at step 310 of FIG. 4g.

The system moves to row x (step 400). The determination at step 410 is false. The number of rows (1) is equal to the number of migration paths identified (1). There is therefore no valid migration path to present to the user (step 700). This time the current point in the processing is as a result of a state selected from list L1 (step 710). Thus the selected state (i.e. S3) is removed from L1 and added to list L3 (step 720). An error message that there is not a valid migration path to the resultant state using the state removed from L1, is presented to the user (step 740). Processing loops round to FIG. 4a to try and find a valid migration path.

The system variables have the following values:
cmp=R0
L0 is empty
L1=S0, S1, S2, S5, R1
L3=S3

At step 160 of FIG. 4a, it is determined that there is not at least one action in list L0. Processing therefore proceeds to FIG. 4h. The second indicator is set (step 750) and so one is added to x (x now equals 2);

a new row is added to the migration path array (mpa) with path id ($pid_x$) set to 2;

the cmp is set to the Redundant state and the nmp is set to equal x. At step 760 all states in L1 are presented:

S0, S1, S2, S5, R1 and the user selects a state at step 770 (e.g. S0). At step 780 all actions which can lead to S0 are presented—i.e. a0. At step 790, the user selects the action and at step 800 this is added to the current migration path which now becomes R0-a0-S0. It is determined at step 810 whether the resultant state has been reached and since the answer is no, the first indicator is set to incomplete at step 820 and processing advances to FIG. 4b. The migration path array now looks as follows:

| Path Id | Migration Path | 1st Indicator | 2nd Indicator |
|---------|---------------|---------------|---------------|
| 1       | R0-a3-S3      | C             | I             |
| 2       | R0-a0-S0      | I             |               |

Processing subsequently continues in the same way as example 1.

Example 4

The final example is described in which there is an action from the redundant state R0 to a non-actionless state but it is part of an invalid migration path. This is shown by dotted line 2 in FIG. 7a.

Once again a migration path array is defined (step 120), the appropriate variables are initialised (step 130), the redundant state R0 is assigned to the migration path in row 1 and the path id is set to 1 (step 140). List L0 includes action a1.1 (step 150) and since there is at least one action in L0 processing proceeds to FIG. 4j.

At step 200 state S1 is listed at step 200. At step 210, S1 is appended (along with action a1.1) to the current migration path and the migration path attribute at row x. As this is not the resultant state (step 220), the first indicator is set to incomplete (step 230):

| Path Id | Migration Path | 1st Indicator | 2nd Indicator |
|---------|---------------|---------------|---------------|
| 1       | R0-a1.1-S1    | I             |               |

There is only one action in L0 and so processing moves to FIG. 4e. The row currently being processed is not less than the number of migration paths (step 300) and so x is set to 1 at step 310 of FIG. 4g.

The system moves to row 1 (step 400, FIG. 4b) and it is determined that row 1 is incomplete and not invalid (step 410). Thus the current migration path is set to the migration path for the current row at step 420 (R0-a1.1-S1) and it is determined at step 430 that there is no action to advance to a non-actionless state or the resultant state (step 430). Thus the first indicator is set to complete and the second indicator is set to invalid at step 435:

| Path Id | Migration Path | 1st Indicator | 2nd Indicator |
|---------|---------------|---------------|---------------|
| 1       | R0-a1.1-S1    | C             | I             |

The determination at step 300 is false and so x is set to 1 at step 310 of FIG. 4g. Processing moves to row 1 (step 400) where it is determined that the path is incomplete but invalid (step 410).

At step 600 (FIG. 4O, it is determined that x is equal to the number of migration paths identified. At step 700 it is determined that there are no valid migration paths to present to the user.

Since the route followed was as a result of an action selected from list L0 (step 710), the selected action a1.1 is removed from list L0 and the state the action would have resulted in is added to L3 (step 720). At this point an error message is displayed indicating that the state added to list L3 is invalid—there is not a valid migration path to resultant state using this state (step 740). Processing then carries on to FIG. 4a to look for a valid migration path. Note that the choice of future actions will not include any which result in a state in list L3 (see step 430 of FIG. 4c).

Thus, as a result of the processing described above, the user is presented with a list of valid migration paths to select from. The selection of a valid migration path creates an interim schema such as the one shown in FIG. 7b.

Figure 7C:
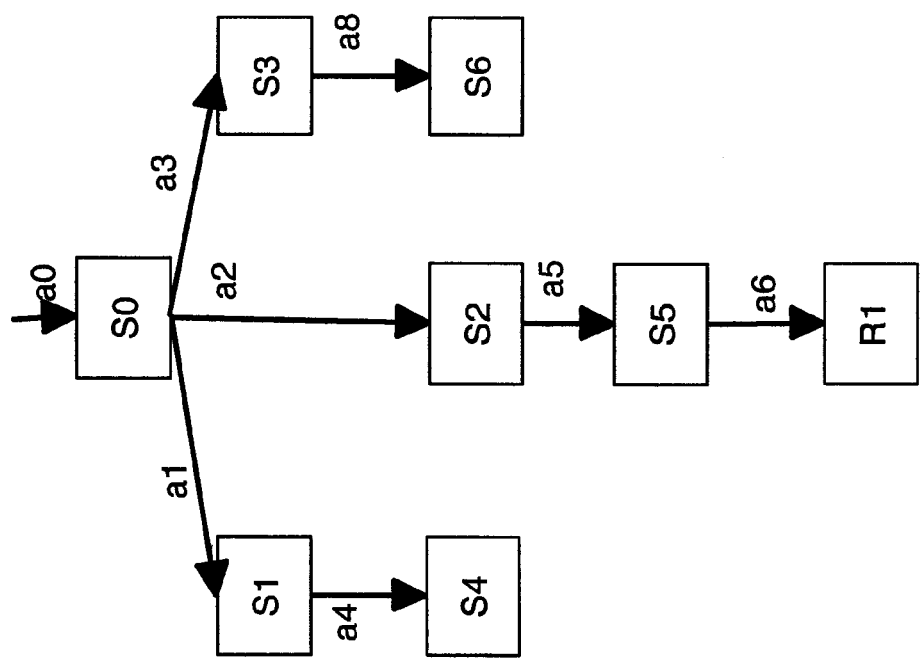

The processing described above will ensure that the migration of data from a source schema to a target schema will adhere to rules defined in the interim schema and then the target schema of FIG. 7c.

Figure 5A:
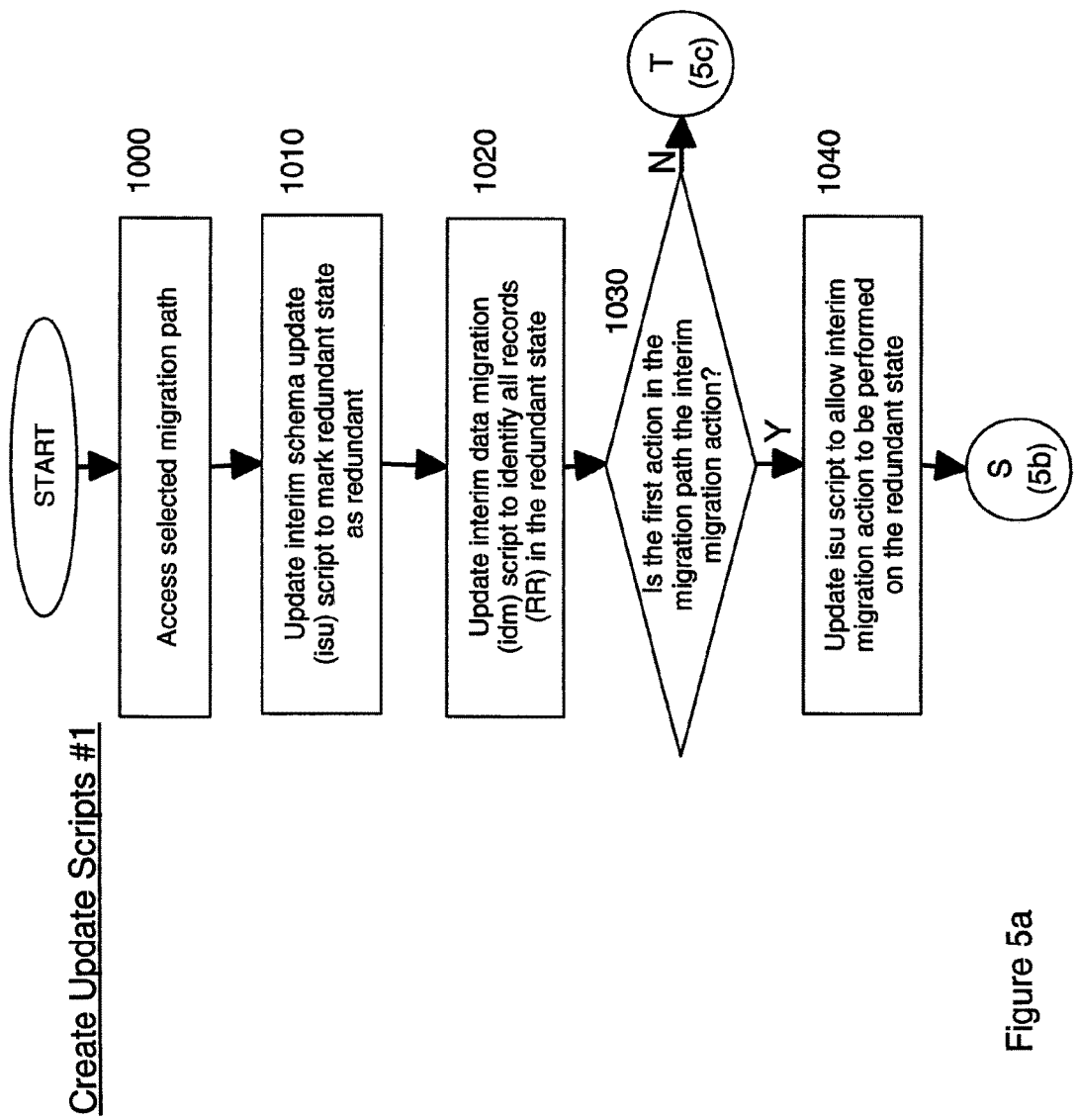
FIGS. 5a to 5c illustrate, in accordance with a preferred embodiment of the present invention, the update of the scripts used to update the schema rules and migrate database records.
Figure 5B:
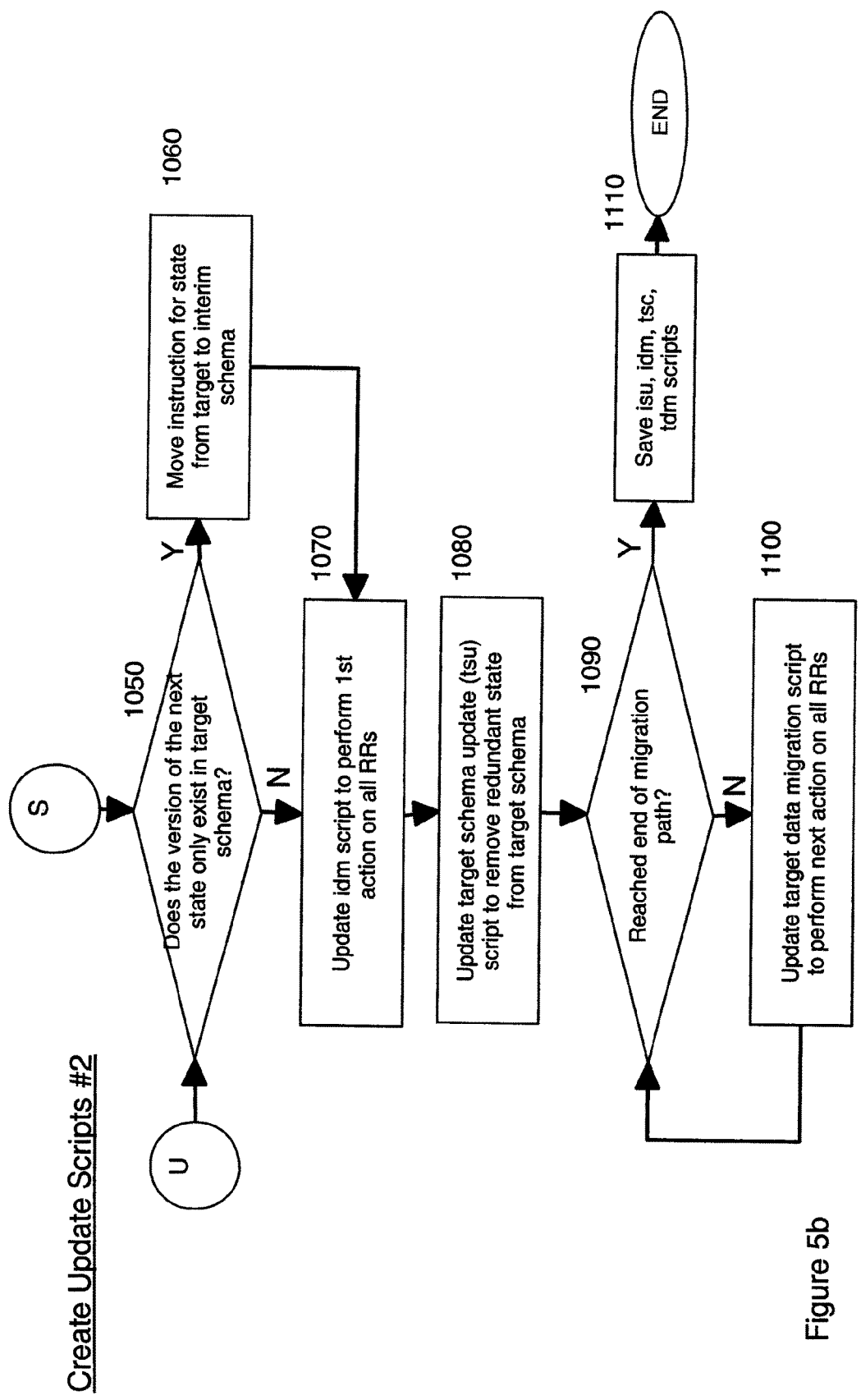
Figure 5C:
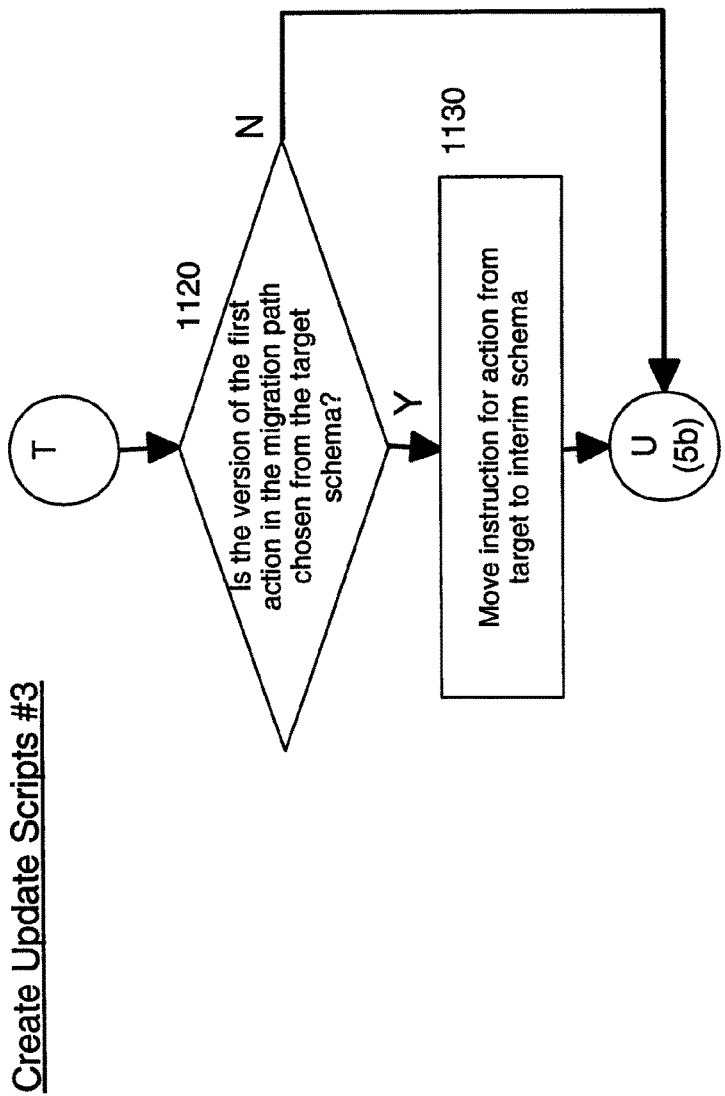

The update of a source schema in order to create interim and target schemas, as well as the migration of data records in an associated database, are achieved via various schema update and data migration scripts. The creation of these scripts is illustrated in FIGS. 5a, 5b and 5c.

The selected migration path is accessed at step 1000. Looking at the interim schema of FIG. 7b, this might be:

R0-a0-S0-a2-S2-a5-S5-a6-R1 a0 is classed as an interim migration action because it did not exist as part of the source schema but had to be chosen from the list of available actions that existed in the source schema.

Once the migration path has been chosen, an entry is made in an interim schema update (isu) script such that when the script is run, the redundant state is marked as such (step 1010). This is shown in FIG. 8.

At step 1020, an interim data migration (idm) script has a command included which when executed will identify all records in the redundant state.

It is determined at step 1030 whether the first action in the migration path (i.e. a0) is the interim migration action. In this case the answer is yes and so the isu script is updated such that when executed it allows the interim migration action to be performed on the redundant state (step 1040).

Processing then proceeds via S to FIG. 5b, step 1050. If the test at step 1030 had proved negative, then processing would have proceed via T to FIG. 5c, step 1120.

At step 1120, it is determined whether the version of the first action in the migration path is chosen from the target schema. If the answer is yes, then the instruction to update the action to this version is moved from the tsu script to the isu script so the new version of the action becomes valid in the interim schema (step 1130). Processing then proceeds via U to FIG. 5b (as indeed it would have, if the test at step 1120 had proved negative).

It is determined at step 1050 whether the version of the next state only exists in the target schema. If the answer is yes, then the instruction to update the state to this version is moved from the tsu script to the isu script so that the new version of the state becomes valid in the interim (step 1060). Processing then proceeds to step 1070 (as indeed it would have, if the test at step 1050 had proved negative).

At step 1070, the idm is updated such that when executed, the first action will be performed on all redundant records.

The tsu is then updated such that when executed the redundant state is removed from the target schema (step 1080).

Step 1100 is performed until the end of the migration path is reached (step 1090). Step 1100 involves adding an instruction to perform the next action on all redundant records to the tdu script.

When instructions for all actions in the migration path have been added, all scripts are saved (step 1110) and processing ends.

As shown in FIG. 6, when it is time to upgrade the source schema to a target schema and to migrate records in the redundant state to a valid state, the saved scripts are then executed (steps 1200, 1210, 1220, 1230).

Executing the saved scripts in the order specified will result in all records in a redundant state being upgraded to a new valid state, in conformance with the target schema (FIG. 7c).

Thus the solution disclosed preferably defines a migration path for every redundant state, by the person (Schema Administrator) who is deleting the state. This is the right person to identify the correct migration path for the redundant state as their role understands the rules associated with the schema and the impact of any change to these rules. The preferred embodiment also automatically generates the scripts to update both the schema and the underlying data, ensuring that data integrity is maintained throughout the migration and completely removing the need for any additional migration steps during a schema update.

One benefit of the approach described is that schema changes can be batched together and executed together.

The invention claimed is:

1. A system for migrating records in a database from a source database schema to a target database schema, the system comprising:
   a computer with memory and at least one processor;
   a database coupled to the computer;
   a database access tool executing in the memory of the computer and comprising program code enabled upon execution in the memory of the computer to migrate the source database schema to the target database schema by:
   receiving a request to delete a state from the source database schema;
   marking said state as an actionless redundant state indicating said state requested to be deleted;
   identifying a resultant state present in the target database schema to which to migrate database records in the redundant state;
   defining a migration path array having a plurality of attributes including a migration path attribute beginning with the redundant state;
   defining a plurality of variables including a current migration path variable set to the redundant state, a number of migration paths variable identifying a number of rows in the migration path array, a first incomplete migration path variable, a variable listing the resultant state and all other non-actionless states in the target database, and a variable indicating states that do not lead to a valid migration path;
   calculating a valid migration path between the redundant state and the resultant state using the defined variables and defined migration path array by determining whether an action exists in the source schema to advance a record from the redundant state to a first state in a possible migration path; and,
   using a valid migration path to migrate database records in the redundant state to the resultant state, in accordance with the target schema, and using the interim schema to permit database records in the redundant state to be moved between the redundant actionless state and the first state.

2. The system of claim 1, wherein the step of identifying the resultant state to which to migrate database records in the redundant state comprises:
   receiving user input indicating the desired resultant state.

3. The system of claim 2, wherein the step of calculating the valid migration path between the redundant state and the resultant state comprises:
   identifying one or more valid and invalid migration paths, wherein a migration path is invalid if it does not permit migration to the resultant state.

4. The system of claim 1, further comprising:
   presenting a user with at least one valid migration path between the redundant state and the resultant state; and
   permitting the user to select a valid migration path to which to migrate database records in the redundant state.

5. The system of claim 1, further comprising:
   responsive to a negative determination, presenting the user with one or more actions, said one or more actions being those which advance from a state in the source schema to the first state; and
   permitting the user to select one of the presented actions to form part of a possible migration path.

6. The system of claim 1, further comprising:
   responsive to determining that an action exists in the source schema to advance a record from the redundant state to a first state in a possible migration path, presenting for selection to the user the action in the source schema which exists to advance a record from the redundant state to the first state.

7. The system of claim 1, further comprising:
   determining whether the selected first state is part of a valid migration path; and
   responsive to a negative determination, requesting the user to select another first state.

8. The system of claim 1, wherein the redundant state is marked as redundant in an interim schema.

9. The system of claim 1, further comprising:
   migrating database records in the redundant state to the first state in accordance with the interim schema.

10. The system of claim 1, further comprising:
    creating a target schema by which to migrate database records in accordance with, the redundant state being absent from the target schema.

11. The system of claim 1, wherein the step of using the valid migration path to migrate database records in the redundant state to the resultant state comprises:
    identifying database records in the redundant state.

* * * * *